(12) United States Patent
Knowles

(10) Patent No.: US 11,320,938 B1
(45) Date of Patent: May 3, 2022

(54) ACOUSTIC MODE TOUCH PANELS WITH SELECTABLE CHARACTERISTICS

(71) Applicant: Street Smart Sensors LLC, Austin, TX (US)

(72) Inventor: Terence J. Knowles, Lake Barrington, IL (US)

(73) Assignee: Texzec, Inc., Aurora, IL (US)

( * ) Notice: Subject to any disclaimer, the term of this patent is extended or adjusted under 35 U.S.C. 154(b) by 0 days.

(21) Appl. No.: 17/240,190

(22) Filed: Apr. 26, 2021

(51) Int. Cl.
  *G06F 3/043* (2006.01)
(52) U.S. Cl.
  CPC .................................. *G06F 3/0436* (2013.01)
(58) Field of Classification Search
  CPC .................................................... G06F 3/0436
  See application file for complete search history.

(56) References Cited

U.S. PATENT DOCUMENTS

| | | | |
|---|---|---|---|
| 4,642,423 A | 2/1987 | Adler | |
| 5,072,427 A | 12/1991 | Knowles | |
| 5,162,618 A | 11/1992 | Knowles | |
| 5,177,327 A | 1/1993 | Knowles | |
| 6,087,599 A * | 7/2000 | Knowles | G06F 3/0436 178/18.04 |
| 8,119,221 B2 * | 2/2012 | Mennig | C08K 9/04 428/141 |
| 9,880,044 B2 * | 1/2018 | Knowles | G01F 23/2962 |
| 10,678,380 B2 | 6/2020 | Hecht et al. | |
| 2013/0147769 A1 * | 6/2013 | Knowles | G06F 3/043 345/177 |

* cited by examiner

*Primary Examiner* — Towfiq Elahi
(74) *Attorney, Agent, or Firm* — Levenfeld Pearlstein, LLC

(57) ABSTRACT

A touch panel as thin or thick as desired has increased touch sensitivity and decreased sensitivity to water includes. The panel or sensor includes a substrate having first and second surfaces and an edge between the surfaces defining a thickness. First and second pluralities of echelons are arranged on the substrate in first and second arrays along first and second centerlines. Each echelon in the pluralities of echelons is formed at an angle relative to their centerlines. First and second shear transducers are mounted on the edge of the substrate and are configured to generate shear waves in a source wave mode in a direction along their centerlines. The shear waves are reflected at the angle by the one or more of the plurality of echelons in the arrays to a sensing wave or the shear wave is converted to a different wave mode than the source mode. The sensing waves are reflected off of an edge opposing the centerlines and are sensed by the transducers.

21 Claims, 21 Drawing Sheets

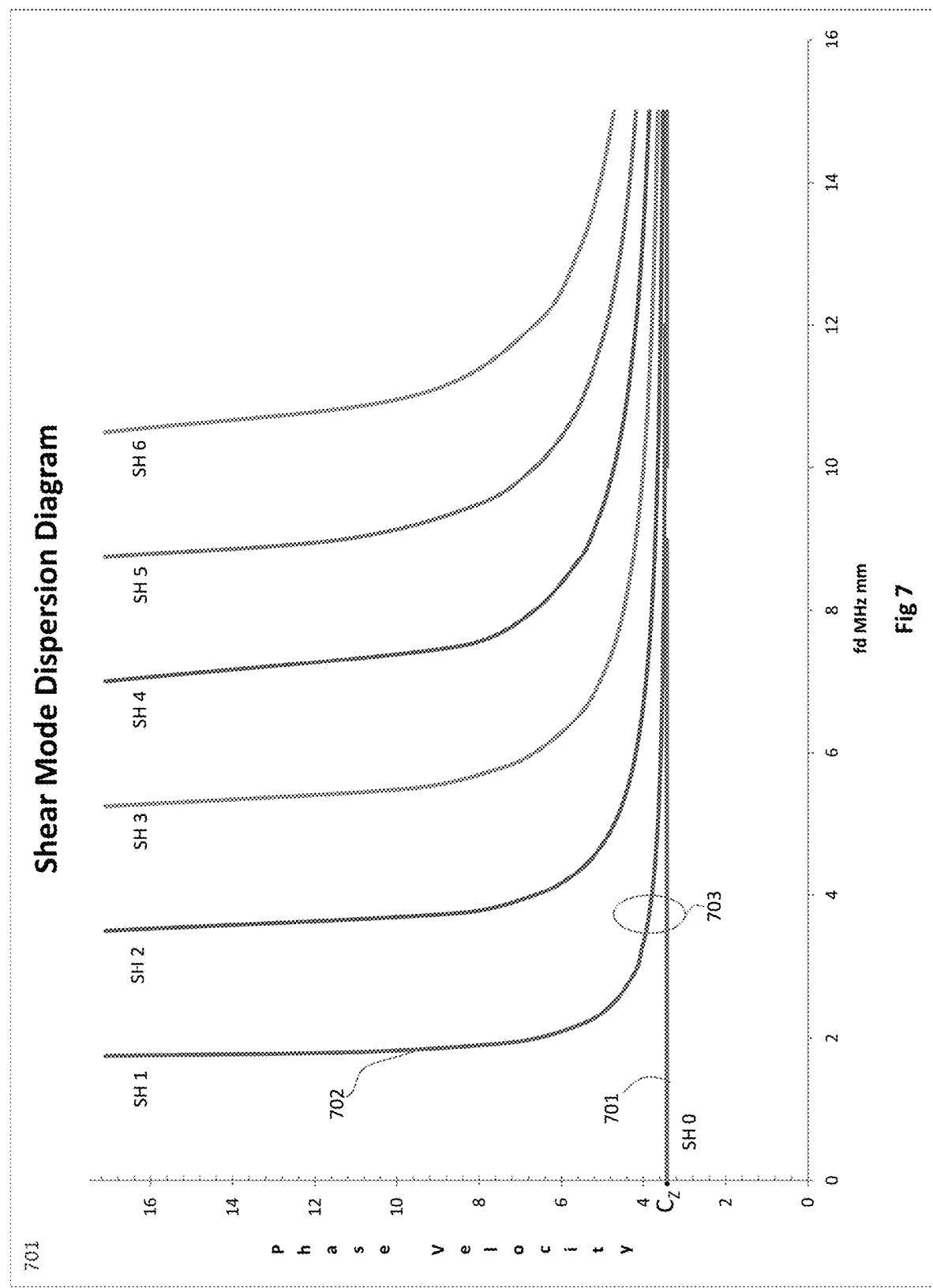

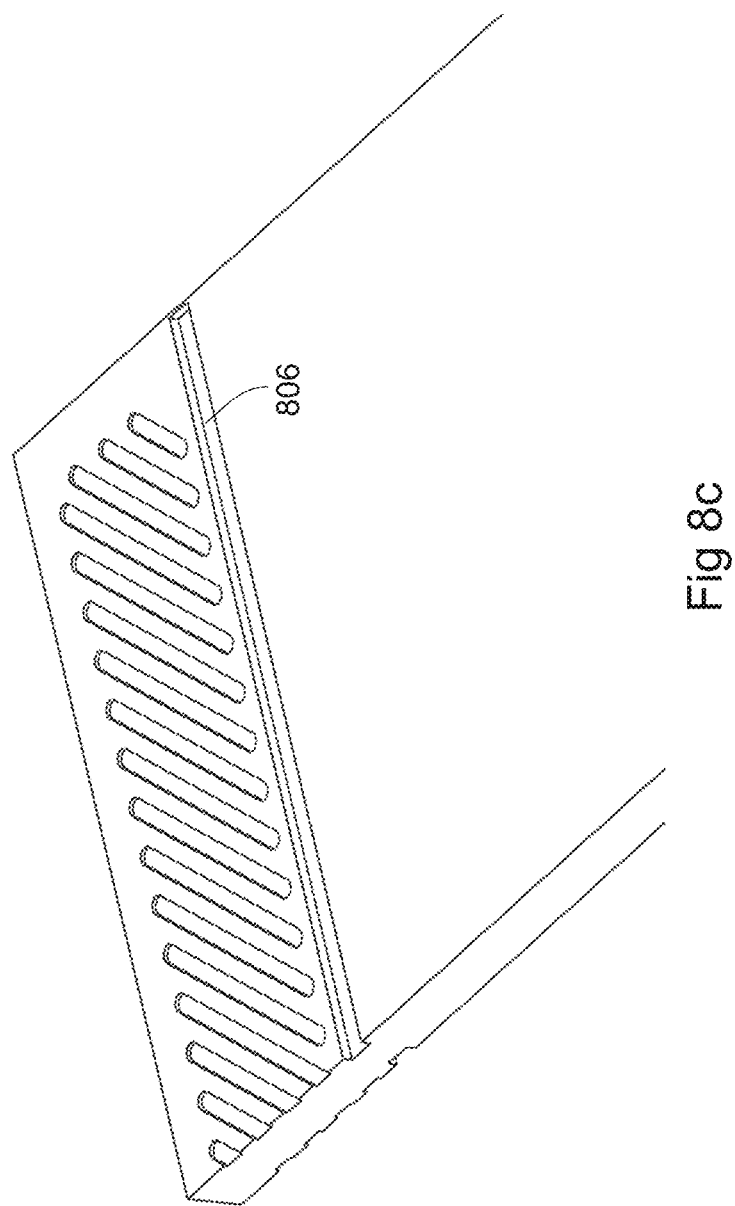

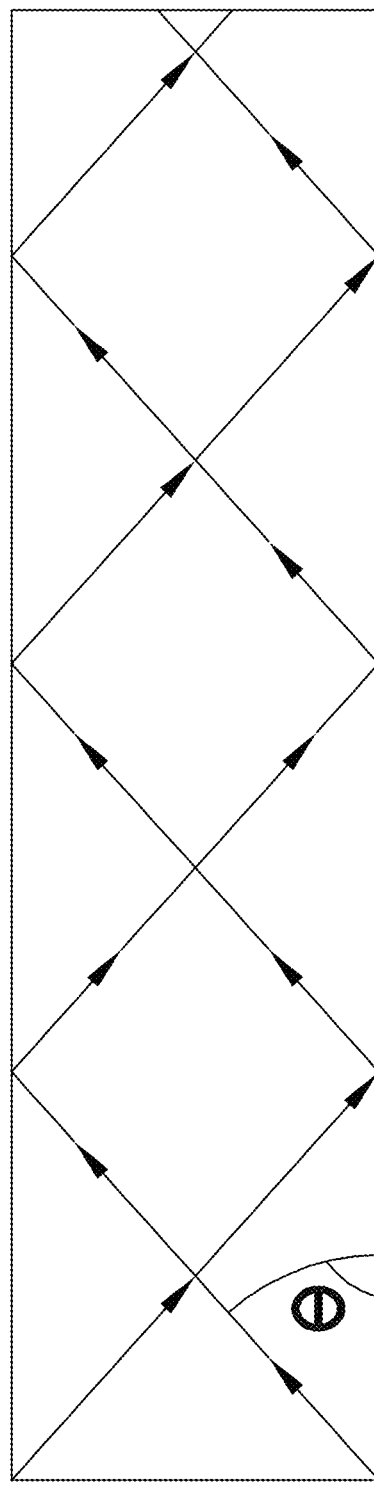

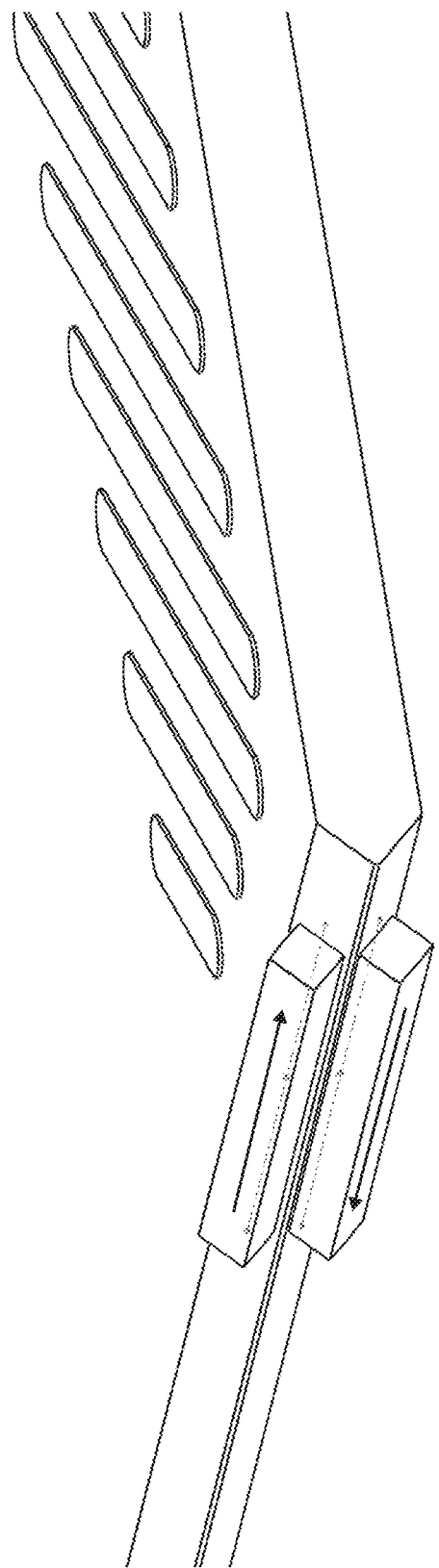

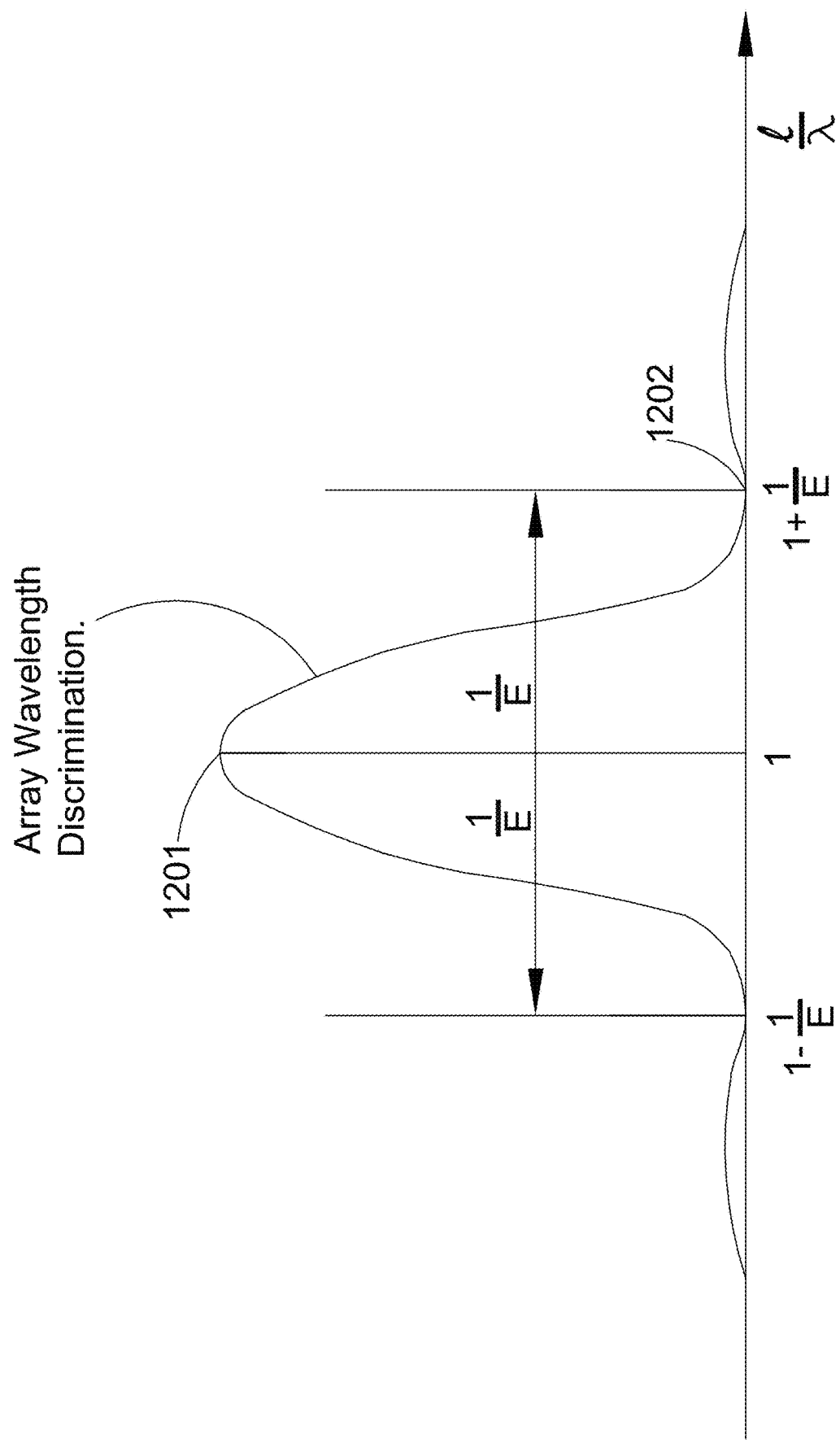

ACOUSTIC MODE TOUCH PANELS WITH SELECTABLE CHARACTERISTICS

BACKGROUND

The present disclosure pertains to touch panels, and more particularly to touch panels having selectable characteristics.

Touch panels operating in lowest order shear mode or Zohps are known, for example, as disclosed in Knowles, U.S. Pat. No. 5,177,327 (Knowles, '327). These touch panels employ acoustic reflective arrays first proposed by Martin for use in reflective array compressors. See, Martin, T. A., *The IMCON Pulse Compression Filter and its Applications*, IEEE Transactions on Microwave Theory and Techniques, Vol. MTT-21, No. 4, April 1973.

Shear modes in general have wave motion entirely in the plane of the touch panel and transverse to the direction of travel. The first commercial acoustic touch system incorporating reflective arrays employ surface acoustic waves (SAW) (see, Adler, U.S. Pat. No. 4,642,423), and though widely used suffers from a number of limitations. These include excessive sensitivity to surface contaminants such as water and sealants, restricted placement of the transducers, and limits on how thin the touch panel can be.

The SAW mode has both out of plane and in plane wave motion at the touch surface which are responsible for its sensitivity to finger touch but also to water and the like. The thinness limitation is due to the fact that the term "surface acoustic wave" is something of a misnomer and should only be applied when propagating in an infinitely thick substrate. In touch panels SAW is a combination of zeroth order symmetric and anti-symmetric Lamb waves and as the thickness of the touch panel is reduced the wave velocities of these two modes diverge causing interference effects.

Despite these limitations "SAW" has enjoyed some commercial success, whereas the fundamental lowest order shear wave type has not. Partly this is because the fundamental shear type has the opposite problem to SAW in that it has a thickness constraint with an upper limit in practice of about 1 mm. This means that for many applications the touch panel needs to be laminated to a backing panel of similar material for strength, adding cost and complexity to the production process.

Another drawback with the fundamental shear mode or Zohps sensor is that touch sensitivity is limited. As such, with the introduction of products with projected capacitance touch screens, users have become accustomed to a touch screen responding by sliding a finger over the screen with minimal touch pressure.

Two other acoustic touch panels were conceived that introduced the concept of mode conversion. In one the Zohps source mode is converted to a Lamb sensing mode (Knowles, U.S. Pat. No. 5,072,427 (Knowles '427)). In the other a SAW source mode is transformed to a Zohps mode (Knowles, U.S. Pat. No. 5,162,618 (Knowles '618)). Neither of these touch panel versions have been commercialized to date, although as disclosed herein the concept of mode conversion can be extremely useful.

Since the Adler and Knowles '427 and '618 patents were issued touch sensors have found wide usage in for example, cell phones, touch pads, and automobiles. Most of these applications use what is known as projected capacitance touch panels because of their touch sensitivity, light weight, multi touch capability and ease of integration to a display. Projected capacitance touch sensors also have drawbacks. They are sensitive to liquids on the touch surface and they do not operate well with gloves. In addition they have sun light readability issues and can create electromagnetic interference. Further, these panels do not scale well to larger displays.

In an attempt to reduce some of the integration problems and costs associated with SAW touch sensors, Hecht et al., U.S. Pat. No. 10,678,380 discloses a SAW to Lamb mode conversion array acoustic touch sensor. However, the Lamb waves employed are highly dispersive and cause touch position inaccuracies that need to be corrected with schemes that add cost and complexity. In addition, excessive dispersion also causes increased sensitivities to temperature and variation in touch panel thickness.

Further these panels are as sensitive to water as SAW and are still restricted to, or require, four inefficient SAW generating and receiving elements that must be positioned on a major surface. In order to decrease the thickness of the touch panel, acoustically benign strips must be affixed and acoustically coupled along the four edges of the panel adding further costs and complexity.

Bezel free displays, considered highly desirable for an increasing number of applications present difficulties for SAW and the Hecht et al. SAW to Lamb sensors because the four SAW generating or receiving elements may interfere with convenient mounting to a display. Laminating the touch panel to a display may be a desirable option as it increases impact resistance and improves display readability. However, this is difficult with Lamb modes with dominant out of plane wave motion as in the Hecht patent because the lamination adhesive absorbs Lamb wave energy and can cause excessive wave attenuation.

Despite a current lack of commercial success the panel disclosed in the Knowles '327 patent has some attractive features. For example, it is not sensitive to water, needs only one array per coordinate, the transducers are directly coupled to the edge of the panel and it can be laminated with minimal acoustic attenuation. The one array per coordinate feature can be used to advantage to create acoustic sensors with redundancy for higher reliability with multiple characteristics.

Accordingly there is a need for a sensor as touch sensitive as the projected capacitance type but with low EMI and optical reflectivity. Desirably, such a sensor can be fabricated as thin or as thick as desired, is sensitive to gloved touch, insensitive to water, and straight forward to integrate to a display, including lamination to a display surface.

SUMMARY

The limitations of the prior known shear mode touch sensors are overcome by generating higher order shear modes and sensing with higher order shear modes or lamb modes, depending on the desired application or use. Informed mode selection is made possible by a thorough understanding of the solutions of the general wave equation for elastic plates including the effects of operating conditions on wave motion.

The generation of desired modes and the suppression of spurious modes which may potentially be generated is made possible by the placement and alignment of transducers, the placement and alignment of pairs of arrays, and the wavelength filtering properties of the arrays in accordance with certain design formulae.

Performance is further enhanced by a method of confining source modes to the arrays in the presence of wave diffraction through the use of collimation grooves and by the deployment where advantageous of non-Newtonian coatings which preferentially absorb undesired wave motion.

In an aspect, a touch panel includes a substrate having first and second surfaces and edges extending between the first and second surfaces defining a thickness. A first plurality of echelons is arranged on the first surface of the substrate in a first array along a first centerline. Each echelon in the first plurality of echelons is formed at a first angle relative to the first centerline.

A first shear transducer is mounted on the edge of the substrate and generates a shear wave in a source wave mode in a first direction along the first centerline.

A second plurality of echelons is arranged on the first surface of the substrate in a second array along a second centerline. Each echelon in the second plurality of echelons is formed at a second angle relative to the second centerline. The second centerline is orthogonal to the first centerline.

A second shear transducer is mounted on the edge of the substrate and generates a shear wave in a source wave mode in a second direction along the second centerline.

The shear wave generated by the first shear wave transducer propagates along the first centerline and is reflected at the first angle by the one or more of the plurality of echelons in the first array to a first sensing wave or the shear wave is converted to a different wave mode than the source mode. The first sensing wave is reflected off of an edge opposing the first centerline and is sensed by the first transducer. The shear wave generated by the second shear wave transducer propagates along the second centerline and is reflected at the second angle by the one or more of the plurality of echelons in the second array to a second sensing wave or the shear wave is converted to a different wave mode than the source mode. The second sensing wave is reflected off of an edge opposing the second centerline and is sensed by the second transducer.

In embodiments the first transducer is a pair of first transducers and the second transducer is a pair of second transducers. The first pair of transducers is mounted along the edge and the second pair of transducers is mounted along the edge.

The transducers of the first pair of transducers can be oriented to generate stresses in a same direction and the transducers of the second pair of transducers can be oriented to generate stresses in a same direction (i.e., symmetric). Alternatively, the transducers of the first pair of transducers can be oriented to generate stresses in opposite directions and the transducers of the second pair of transducers can be oriented to generate stresses in opposite directions (i.e., anti-symmetric).

In embodiments, the touch panel can further include a third plurality of echelons arranged on the substrate in a third array along a third centerline parallel to the first centerline and on the second side of the substrate, in which each echelon in the third plurality of echelons is formed at a first angle relative to the third centerline, and a fourth plurality of echelons arranged on the substrate in a fourth array along a fourth centerline parallel to the second centerline and on the second side of the substrate, in which each echelon in the fourth plurality of echelons formed at a first angle relative to the fourth centerline.

In such an embodiment, the shear wave generated by the first shear wave transducer propagates along the third centerline and is reflected at the first angle by the one or more of the plurality of echelons in the third array to the first sensing wave or the shear wave is converted to a different wave mode than the source mode, where the first sensing wave is reflected off of an edge opposing the third centerline and is sensed by the first transducer, and the shear wave generated by the second shear wave transducer propagates along the fourth centerline and wherein the shear wave is reflected at the second angle by the one or more of the plurality of echelons in the fourth array to the second sensing wave or the shear wave is converted to a different wave mode than the source mode, where the second sensing wave is reflected off of an edge opposing the fourth centerline and is sensed by the second transducer.

In such an embodiment, the first and third plurality of echelons can be aligned with one another and the second and fourth plurality of echelons can be aligned with one another. Alternatively, the first and third plurality of echelons can be staggered from one another and the second and fourth plurality of echelons can be staggered from one another.

In embodiments, the touch panel can further include a first edge diverter disposed on the edge of the substrate at an end of the first array and a second edge diverter disposed on the edge of the substrate at an end of the second array. The first and second edge diverters convert the source mode from a first mode to a second mode different from the first mode.

In embodiments, the touch panel can further include a non-Newtonian coating on the substrate.

In another aspect, a touch panel includes a substrate having first and second surfaces and edges extending between the first and second surfaces defining a thickness. A first plurality of echelons is arranged on the first surface of the substrate in a first array along a first centerline, each of the echelon in the first plurality of echelons being formed at a first angle relative to the first centerline.

A first shear transducer is mounted on the edge of the substrate, and generates a shear wave in a source wave mode in a first direction along the first centerline, and a first collimation groove is formed in the substrate inboard of, and parallel to, the first array.

A second plurality of echelons is arranged on the first surface of the substrate in a second array along a second centerline, each echelon in the second plurality of echelons being formed at a second angle relative to the second centerline. The second centerline is orthogonal to the first centerline.

A second shear transducer is mounted on the edge of the substrate, and generates a shear wave in a source wave mode in a second direction along the second centerline and a second collimation groove is formed in the substrate inboard of, and parallel to, the second array.

In such a touch panel, the shear wave generated by the first shear wave transducer propagates along the first centerline and is reflected at the first angle by the one or more of the plurality of echelons in the first array to a first sensing wave or is converted to a different wave mode than the source mode. The first sensing wave is reflected off of an edge opposing the first centerline and is sensed by the first transducer, and the first collimation groove confines the source wave to the first array and permits the first sensing wave to traverse beyond the first collimation groove, and the shear wave generated by the second shear wave transducer propagates along the second centerline and is reflected at the second angle by the one or more of the plurality of echelons in the second array to a second sensing wave or is converted to a different wave mode than the source mode. The second sensing wave is reflected off of an edge opposing the second centerline and is sensed by the second transducer, the second collimation groove confines the source wave to the second array and permit the second sensing wave to traverse beyond the second collimation groove.

In embodiments, a depth of the first and/or second collimation groove can be determined by the equation $$\Delta d == \frac{1}{2} d \cdot (\sin\varphi)^2 \cdot \left[\left(\frac{d}{A}\right)^2 - 1\right],$$

where Δd is the depth of the first and/or second collimation groove, γ is a greatest angle allowed for total internal reflection, d is a thickness of the substrate, and A is an order of a wave N, multiplied by Cz, a zeroth order wave velocity, divided by two times the operating frequency.

Such a touch panel can further include a third plurality of echelons arranged on the substrate in a third array along a third centerline parallel to the first centerline and on the second side of the substrate, each echelon in the third plurality of echelons formed at a first angle relative to the third centerline, a third collimation groove formed in the substrate inboard of, and parallel to, the third array and a fourth plurality of echelons arranged on the substrate in a fourth array along a fourth centerline parallel to the second centerline and on the second side of the substrate, each echelon in the fourth plurality of echelons formed at a first angle relative to the fourth centerline and a fourth collimation groove formed in the substrate inboard of, and parallel to, the fourth array.

In such a panel, the shear wave generated by the first shear wave transducer propagates along the third centerline and is reflected at the first angle by the one or more of the plurality of echelons in the third array to the first sensing wave or is converted to a different wave mode than the source mode, and is reflected off of an edge opposing the third centerline and is sensed by the first transducer, and, the shear wave generated by the second shear wave transducer propagates along the fourth centerline and is reflected at the second angle by the one or more of the plurality of echelons in the fourth array to the second sensing wave or is converted to a different wave mode than the source mode. The second sensing wave is reflected off of an edge opposing the fourth centerline and is sensed by the second transducer.

In such a panel, the first collimation groove confines the source wave to the first array and permits the first sensing wave to traverse beyond the first collimation groove, the second collimation groove confines the source wave to the second array and permits the second sensing wave to traverse beyond the second collimation groove, the third collimation groove confines the source wave to the third array and permits the first sensing wave to traverse beyond the third collimation groove, and wherein the fourth collimation groove confines the source wave to the fourth array and permits the second sensing wave to traverse beyond the fourth collimation groove.

In such a panel, the depth of the third and/or fourth collimation grooves can be determined by the equation $$\Delta d == \frac{1}{2} d \cdot (\sin\varphi)^2 \cdot \left[\left(\frac{d}{A}\right)^2 - 1\right],$$

where Δd is the depth of the third and/or fourth collimation groove, φ is a greatest angle allowed for total internal reflection, d is a thickness of the substrate, and A is an order of a wave N, multiplied by Cz, a zeroth order wave velocity, divided by two times the operating frequency.

Such a panel can further include a non-Newtonian coating on the substrate.

In still another aspect, a touch panel includes a substrate having first and second surfaces and edges extending between the first and second surfaces defining a thickness. A first plurality of echelons is arranged on the first surface of the substrate in a first array along a first centerline, each echelon in the first plurality of echelons being formed at a first angle relative to the first centerline.

A first pair of shear transducers is mounted on the edge of the substrate, and generates shear waves in a source wave mode in a first direction along the first centerline.

A second plurality of echelons is arranged on the first surface of the substrate in a second array along a second centerline, each echelon in the second plurality of echelons being formed at a second angle relative to the second centerline. The second centerline is orthogonal to the first centerline.

A second pair of shear transducers is mounted on the edge of the substrate, and generate shear waves in a source wave mode in a second direction along the second centerline.

The shear waves generated by the first pair of shear wave transducers propagate along the first centerline and are reflected at the first angle by the one or more of the plurality of echelons in the first array to first sensing waves or are converted to a different wave mode than the source mode. The first sensing waves are reflected off of an edge opposing the first centerline and are sensed by the first pair of transducers, and the shear waves generated by the second pair of shear wave transducers propagate along the second centerline and are reflected at the second angle by the one or more of the plurality of echelons in the second array to second sensing waves or are converted to a different wave mode than the source mode. The second sensing waves are reflected off of an edge opposing the second centerline and are sensed by the second pair of transducers.

In an embodiment of such a panel, the transducers of the first pair of transducers are mounted on the edge of the substrate transverse to a direction of the first array, and generate waves in anti-symmetric shear mode. The transducers of the first pair of transducers can be spaced from one another a distance determined by the equation, $$Bn = \frac{4}{N \cdot \pi} \cdot \sin\left(\frac{N\pi}{2}\right) \cdot \left[\cos\left(\frac{N\pi c}{d}\right) - \cos\left(\frac{N\pi b}{d}\right)\right],$$

where Bn is an amplitude of each wave of the shear mode, N is an order of the mode, d is a thickness of the substrate, b is a distance from a centerline of the substrate to an outboard edge of the transducers, and c is a distance from an inboard edge of the transducers to a centerline of the substrate.

In another embodiment, the transducers of the first pair of transducers are mounted on the edge of the substrate transverse to a direction of the first array, and generate waves in symmetric shear mode. The transducers of the first pair of transducers can be spaced from one another a distance determined by the equation, $$Bn = \frac{4}{N\pi} \cdot \cos\left(\frac{N\pi}{2}\right) \cdot \left[\sin\left(\frac{bN\pi}{d}\right) - \sin\left(\frac{cN\pi}{d}\right)\right],$$

where Bn is an amplitude of each wave of the shear mode, N is an order of the mode, d is a thickness of the substrate, b is a distance from a centerline of the substrate to an outboard edge of the transducers, and c is a distance from an inboard edge of the transducers to a centerline of the substrate.

In such touch panels, the transducers of the second pair of transducers are mounted on the edge of the substrate transverse to a direction of the second array, and generate waves in anti-symmetric shear mode. The transducers of the first pair of transducers can be being spaced from one another a distance determined by the equation, $$Bn = \frac{4}{N \cdot \pi} \cdot \sin\left(\frac{N\pi}{2}\right) \cdot \left[\cos\left(\frac{N\pi c}{d}\right) - \cos\left(\frac{N\pi b}{d}\right)\right],$$

where Bn is an amplitude of each wave of the shear mode, N is an order of the mode, d is a thickness of the substrate, b is a distance from a centerline of the substrate to an outboard edge of the transducers, and c is a distance from an inboard edge of the transducers to a centerline of the substrate.

And, in such touch panels, the transducers of the second pair of transducers are mounted on the edge of the substrate transverse to a direction of the second array, and generate waves in symmetric shear mode. The transducers of the first pair of transducers can be spaced from one another a distance determined by the equation, $$Bn = \frac{4}{N\pi} \cdot \cos\left(\frac{N\pi}{2}\right) \cdot \left[\left(\sin\left(\frac{bN\pi}{d}\right)\right) - \sin\left(\frac{cN\pi}{d}\right)\right],$$

where Bn is an amplitude of each wave of the shear mode, N is an order of the mode, d is a thickness of the substrate, b is a distance from a centerline of the substrate to an outboard edge of the transducers, and c is a distance from an inboard edge of the transducers to a centerline of the substrate.

Such touch panels can further include a non-Newtonian coating on the substrate.

Further, in such touch panels, the edge can have first and second bevels between the first and second surfaces. The first and second bevels can be formed at angle Θ to one another between and exclusive of 0 degrees and 90 degrees. A first transducer of the first pair of transducers is mounted on the first bevel and a second transducer of the second pair of transducers is mounted on the second bevel.

In such a touch panel, the angle Θ can be determined by the equation, $$\Theta = \tan^{-1}\left[\left(\frac{f}{fco}\right)^2 - 1\right],$$

where f is frequency of the source wave, fco is the cut off frequency given by $$\frac{NCz}{2d},$$

where N is an order or the mode, and Cz is a phase velocity of a zeroth order shear mode, and d is a thickness of the substrate.

Further understanding of the present disclosure can be obtained by reference to the following detailed description in conjunction with the associated drawings, which are briefly described below.

DESCRIPTION OF THE FIGURES

Various embodiments of an acoustic array touch sensor panel are disclosed as examples and are not limited by the figures of the accompanying drawings, in which like references may indicate similar elements and in which:

FIG. 7 is a dispersion diagram for shear modes, and plots phase velocity versus the product of panel thickness times operating frequency (fd in MHz), for the first seven shear modes in a soda-lime glass plate;

FIG. 8c is an illustration of a sensor with a groove for internally reflecting waves;

FIG. 10a illustrates the lowest order mode waves SH0 propagating along the panel and reflecting off of the major surfaces at an angle Θ;

FIG. 10b is an illustration of a bevel-edge panel having two transducers mounted to the panel bevel edges;

FIG. 12 is plot of the amplitude response for waves generated in an acoustic touch panel array;

DETAILED DESCRIPTION

Figure 1:
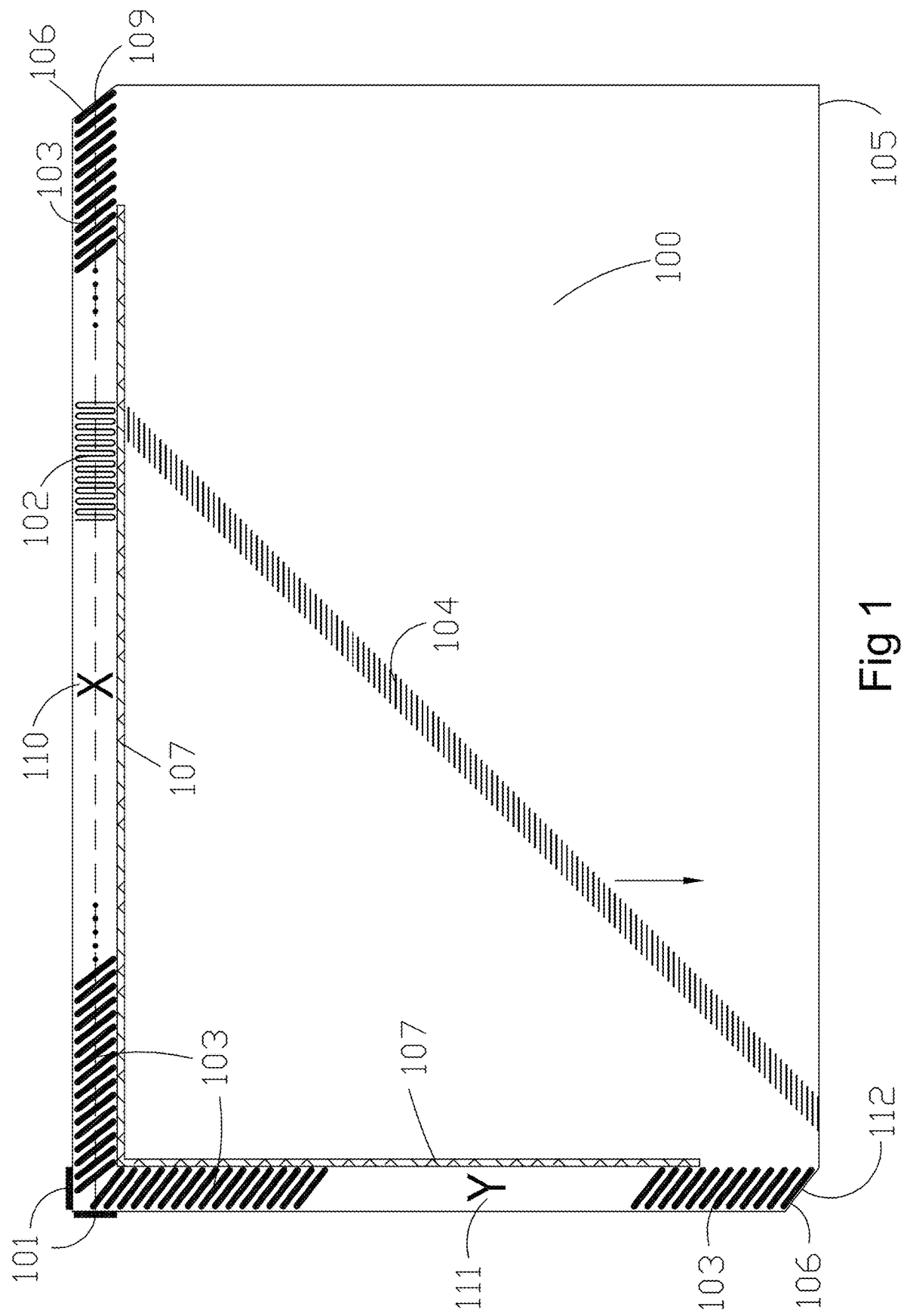
FIG. 1 is a diagram of a two array acoustic touch sensor panel, with edge mounted transducers.

While the present disclosure is susceptible of embodiments in various forms, there is shown in the drawings and will hereinafter be described presently preferred embodiments with the understanding that the present disclosure is to be considered an exemplification and is not intended to limit the disclosure to the specific embodiment illustrated.

FIG. 1 is a diagram of a two array acoustic touch sensor 100, with edge mounted transducers 101. The transducers 101, upon electrical activation, create a burst of shear waves which propagate through the x and y arrays 110, 111, respectively. A burst 102 is shown traversing the x array 110. The sensor 100 includes a series of array echelons 103 that are set at an angle α to their respective axes 109, 112 to either reflect the waves in the source burst or convert them to other wave modes as disclosed in Knowles '427 (see Knowles '472, Eq2).

Waves traversing the array along a first axis 109, are defined as source waves and waves 104 exiting the array 110 are defined as sensing waves. The sensing waves 104 travel to an opposing edge 105 of the sensor 100, reflect, and upon redirection by the array 110 reach the transducers 101 to be converted into an electrical pulse train. Typically not all the source wave energy is converted into sensing waves with either corner diverter 106, or a trapping slot, as disclosed in Knowles '044 converting the remaining source waves to the sensing wave mode.

The purpose of the corner diverter 106 is to prevent source waves reflecting back from edge 105 and interfering with the reception of sensing waves 104 and is indispensable for sensors of this type that use reflection from an opposing edge. In Knowles '327 the diverter angle was 45 degrees, but it has been found advantageous to set it to a conversion angle, typically but not necessarily at an angle to convert to a chosen sensing mode. The reason is that a source mode may have a higher group velocity than the sensing mode. Source mode waves diverted by 106 reflect off of edge 105 and on return to the transducer 101 may interfere with the reception of sensing waves when they have a greater group velocity than the sensing waves. This is eliminated through conversion by edge diverter 106 to the sensing wave mode.

Figure 2:
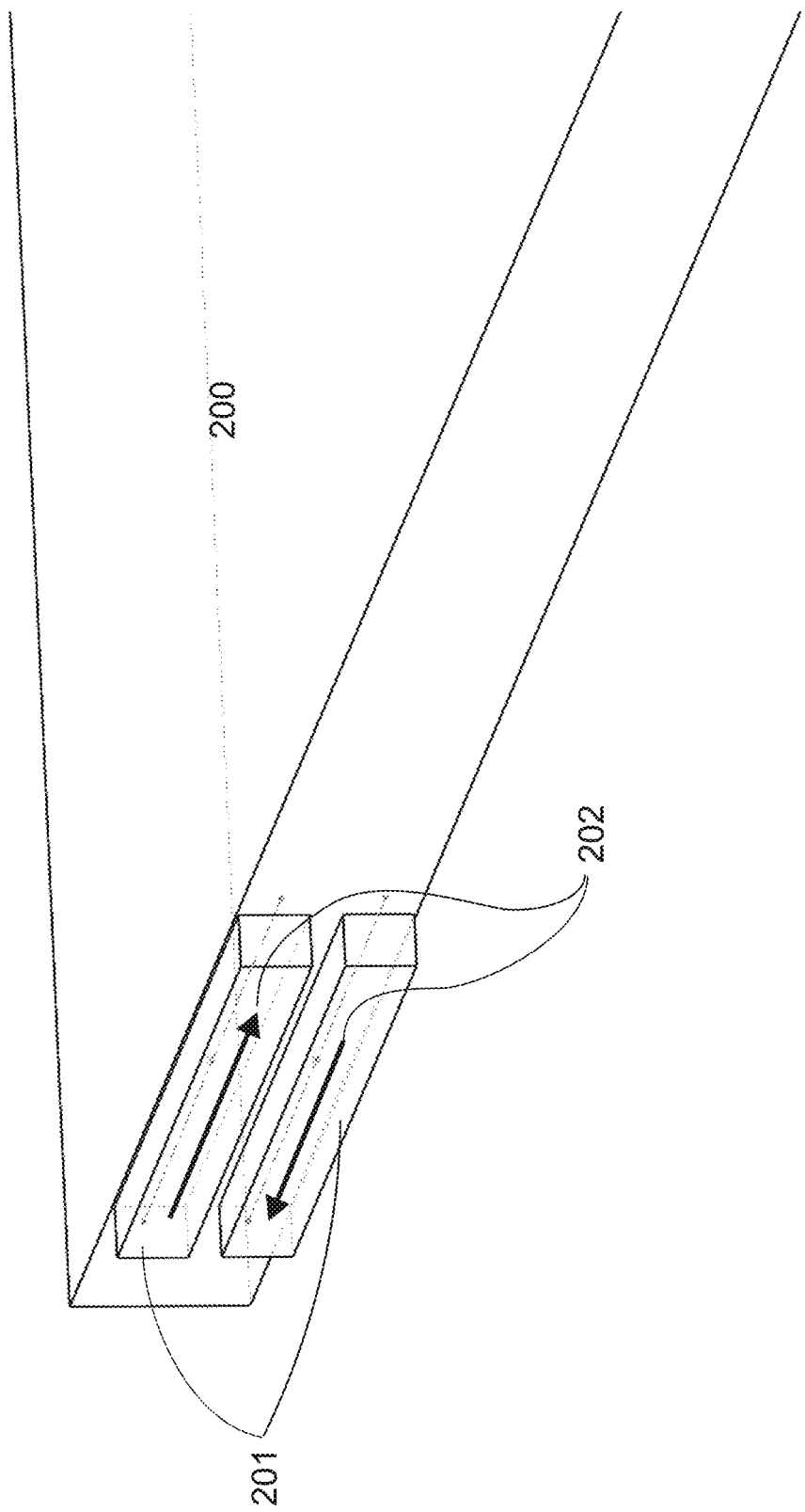
FIG. 2 illustrates the sensor panel of FIG. 1, showing a pair of transducers edge mounted to the panel.

The transducers typically but not exclusively bonded to a panel edge may come in pairs as shown in FIG. 2. Acoustic shear transducers 201, create mechanical stress in a transverse direction when a voltage is applied to their electrodes. The pairs can be configured so the stress of an individual transducer is either in the same direction to its partner (symmetric) or in an opposite direction to its partner 202 (as shown in FIG. 2) to create an anti-symmetric pair, and as discussed herein, this determines the symmetry of the source wave.

Figure 3:
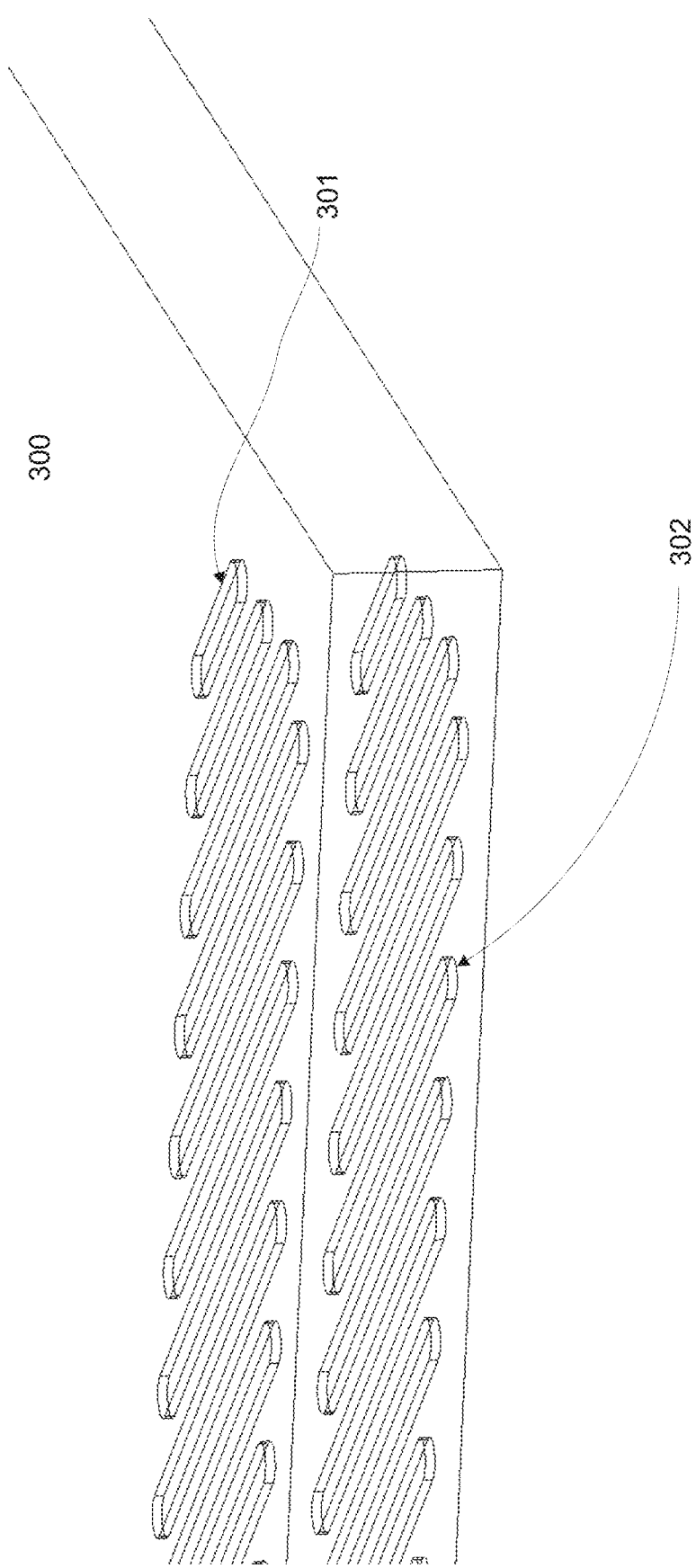
FIG. 3 is a diagram illustrating echelon arrays formed on the top and bottom of the panel.

The arrays 110, 111 may also include a series of top surface echelons and a series of bottom surface echelons, 301 and 302, as shown in FIG. 3. The alignment of the top and bottom array elements 301, 302 with respect to each other determines the symmetry of the sensing modes and aids in eliminating spurious sensing modes.

Referring again to FIG. 1, there can be seen two cross hatched regions shown in front of the arrays 107, which represent shallow grooves formed in the panel and referred to as collimation grooves. The collimation grooves 107 confine the source waves to their respective arrays 110, 111 and reduce energy loss and other artifacts due to diffraction or spreading of the source waves. The collimation grooves 107 can be formed on both surfaces (e.g., top and bottom surface) of the sensor 100.

Figure 4:
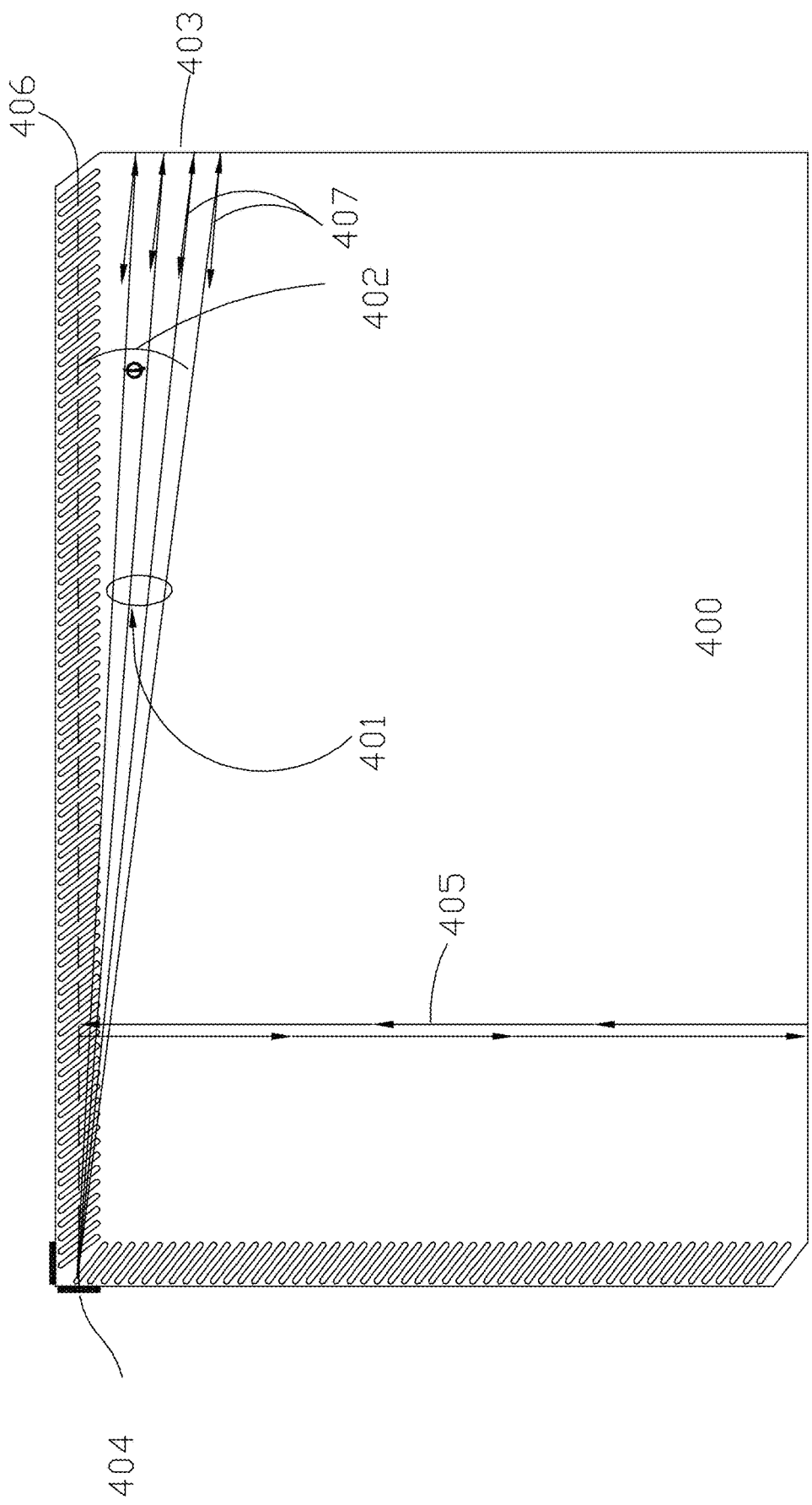
FIG. 4 is a simplified schematic of one of the effects of diffraction relevant to acoustic touch sensors using reflection from an opposing edge of the panel.

It is preferable to confine the source waves to the array because absent confinement they spread due to diffraction. FIG. 4 is a simplified schematic of one of the effects of diffraction relevant to acoustic touch sensors using reflection from an opposing edge. A source beam created by transducer 404 will spread due to diffraction with diffraction components 401 exiting the array at a maximum angle Φ, indicated at 402 These components will reflect from edge 403 and a fraction will return to the transducer assembly 404. Typical value for Φ are in the range of 5 to 8 degrees. Sensing waves 405, shown schematically, can return at the same time as the diffracted waves 407 reflected from edge 403 with comparable amplitudes causing deleterious interference. In prior devices, diffracted wave interference was minimized by affixing a thin strip of absorbing tape and the like in front of the arrays and boosting the sensing wave amplitude when the spurious waves were present through array design. Both these solutions add to cost, complexity and reduce the performance of the sensor. These diffraction effects are removed entirely with the implementation of collimation grooves.

Figure 5:
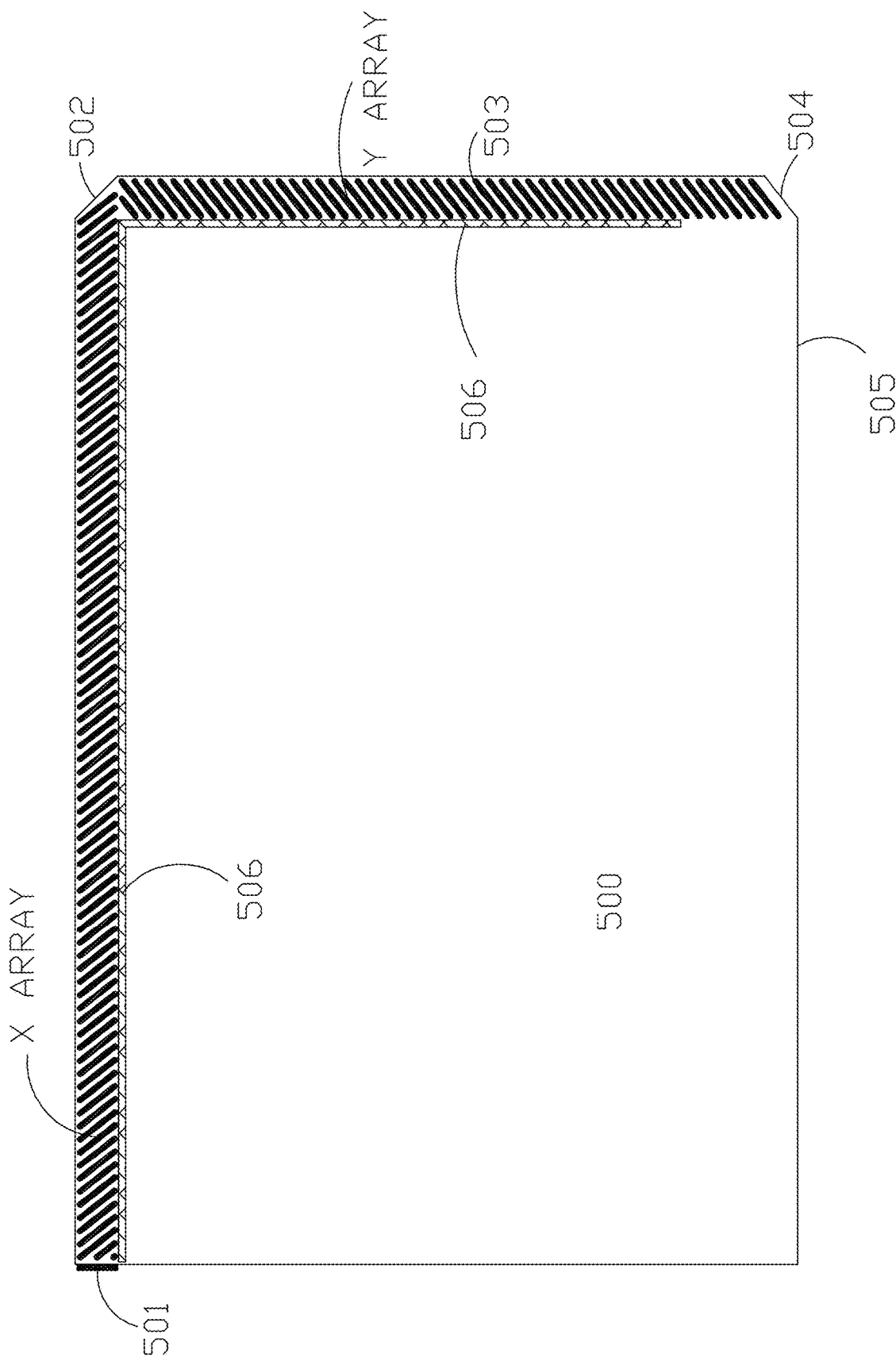
FIG. 5 illustrates a single transducer embodiment of the sensor.

Referring to FIG. 5, there is shown a single transducer version of the sensor 500. Referring to the figure, the transducer 501 may be present as a transducer pair mounted to the edge of the sensor as shown in FIG. 2 and, may include a pair of array elements on upper and lower (or top and bottom surfaces of the sensor) as in FIG. 3. In contrast to FIG. 1, the corner element 502 is typically a 45 degree reflector and serves to divert the source wave burst from the transducer 501 along the x array, into the y array 503. Diverter element 504 serves to prevent source waves reflecting back from edge 505 and interfering with the reception of sensing waves (see FIG. 1), and can be set at the same angle as the y array. Collimation grooves 506 confine the source waves to their respective arrays and reduce energy loss and other artifacts due to diffraction or spreading of the source waves (see, for example, FIG. 1 and accompanying description). The collimation grooves 506 can be etched on both surfaces (e.g., top and bottom surface) of the sensor.

Figure 6:
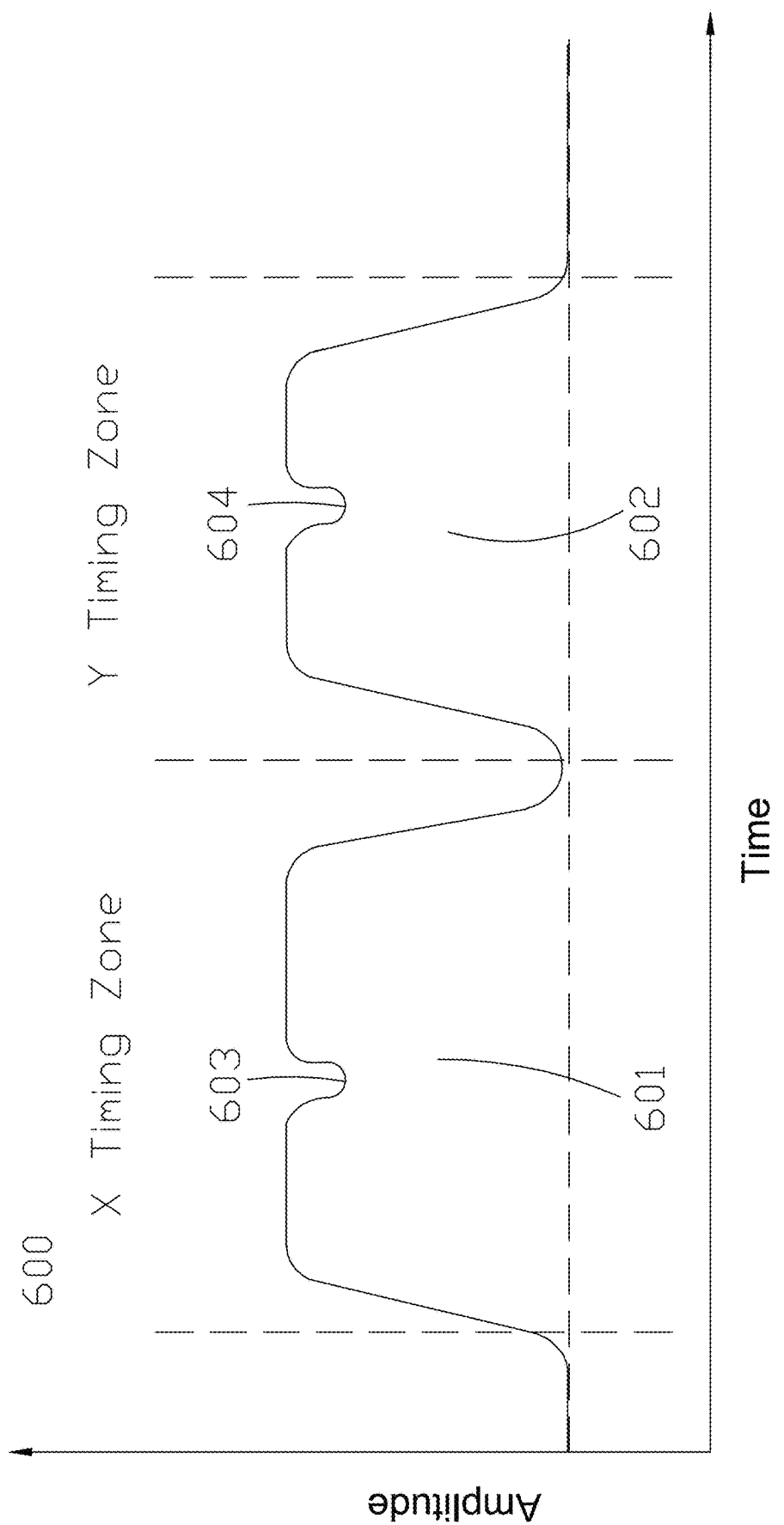
FIG. 6 is a pulse train diagram of a touch event for the single transducer sensor embodiment of FIG. 6.

Referring to FIG. 6, there is shown a single pulse train for the single transducer version as shown in FIG. 6 with x and y coordinate detection of a touch event, as seen at 601 for the x coordinate, and as seen as 602 for the y coordinate, and are determined in a similar manner to that claimed in Knowles '327.

It will be appreciated that collimation grooves reduce the effects of diffraction and that the pairs of transducers and array elements serve to readily determine the symmetry of the source and sensing modes and their mode order.

Referring now to FIG. 7 there is shown a dispersion diagram for shear modes, and plots phase velocity (on the y-axis) versus the product of panel thickness d times operating frequency f (on the x-axis), for the first seven shear modes in a soda-lime glass plate. The plot was generated from what is known as a frequency equation, and forms part of the solution of the wave equation for an elastic body, specifically a plate with zero traction at the two major surfaces.

There are an infinite number of shear modes that may be generated in a glass plate with the first seven plotted in the figure.

The Knowles '427 disclosure employed the zeroth mode, indicated at 701, for both the source and sensing modes and is the reason for the upper thickness limit for this touch sensor. As seen from FIG. 7, starting at the origin, when the product fd increases, which for a fixed frequency means an increase in plate or panel thickness, there is a thickness at which shear wave 702, (SH1) may be generated. A further increase in thickness results in its phase velocity approaching that of SH0. When the velocities are sufficiently close, for example as indicated at 703, the array will generate SH1 as well as the SH0 sensing mode and cause deleterious interference effects. This limits plate thickness to approximately 1 mm in glass.

The techniques required to eliminate these spurious mode effects as the thickness is increased will be described in detail subsequently.

Using zeroth order shear as the source mode remains an option, however, collimation grooves need higher order modes to function because their phase velocity changes with plate thickness in contrast to the zeroth mode and the deployment of these grooves is highly advantageous because they eliminate wave diffraction from both the transducers and the array. Diffraction can also cause significant energy loss due to wave spreading out of the arrays.

A further advantage of higher order source modes is that their group velocities are lower than SH0 and SAW and this implies the potential for higher touch sensor spatial resolution for fixed temporal resolution in the signal processing unit.

Figure 8A:
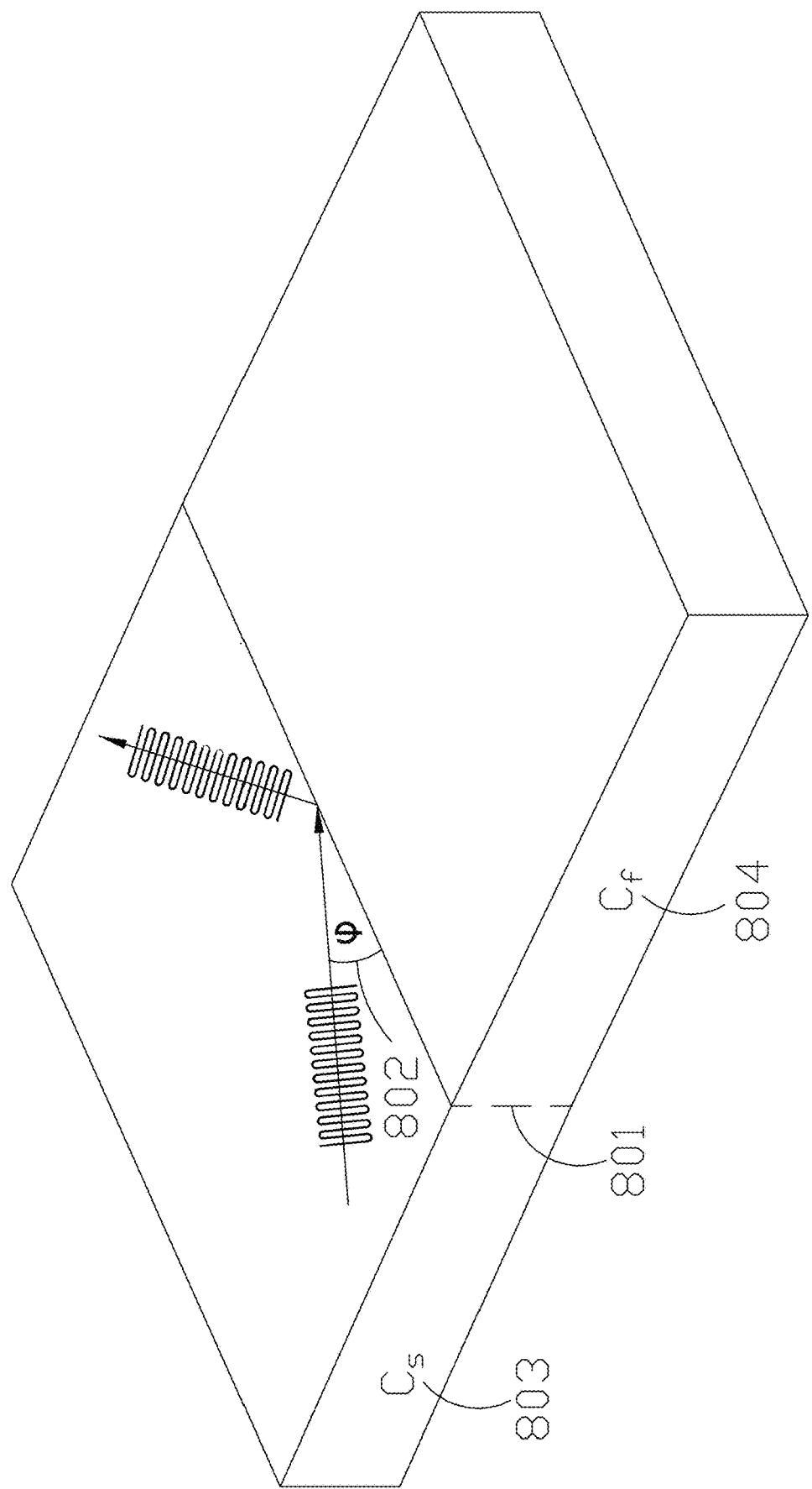
FIG. 8a is an illustration of a group of acoustic waves reflecting at the boundary between regions with different phase velocities.

Referring to FIG. 8a, this illustrates a group of acoustic waves reflecting at the boundary between regions (regions 803 and 804) with different phase velocities. The condition for the maximum angle allowed for waves to totally internally reflect from a boundary, (801), parallel to the first axis is given by:

$$\cos\varphi = \frac{Cs}{Cf}, \qquad \text{Eq 1}$$

where φ (802), is the greatest angle allowed for total internal reflection, and

Cs and Cf are the phase velocities either side of the boundary 801, with Cf necessarily greater than Cs. Total internal reflection can only occur when waves from a region of lower phase velocity encounter a boundary with a higher wave velocity region.

Figure 8B:
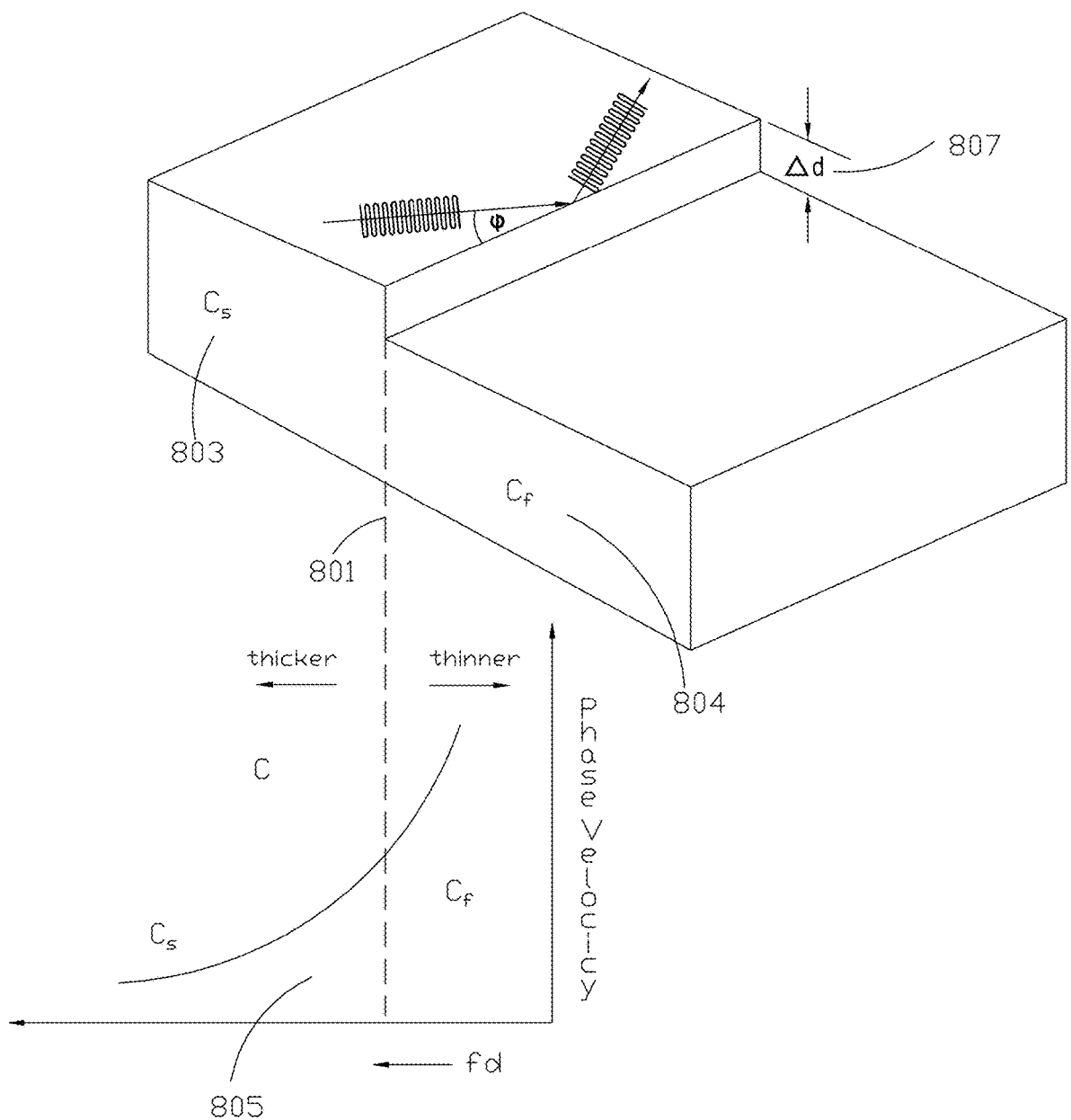
FIG. 8b is an illustration of a group of acoustic waves reflecting at a step boundary between regions with different phase velocities.

The condition that waves may be totally internally reflected when traveling from a slower phase velocity region to a higher phase velocity region is satisfied by higher order shear waves at a thickness step boundary as shown in FIG. 8b. This is due to the fact as shown in the accompanying dispersion diagram 805 that the phase velocity on the thicker side will be lower than on the thinner side.

As illustrated in FIG. 8c, in practice a groove 806, several sensing wavelengths wide can replace the step. As such, grooves of sufficient depth formed at the front and back surfaces of an array can act as a waveguide for source modes.

As an example we assume based on theory and practice that the maximum angle of diffracted waves to create artifacts is seven degrees. We require any waves traveling at seven degrees or less from the first axis to be totally internally reflected by a step in the plate thickness and from these assumptions, we calculate the magnitude of the step Δd 807 (see FIG. 8b).

The equation to calculate this depth, derived from substituting Eq. 1 into the frequency equation for shear modes together with some simplifying assumptions is given by:

$$\Delta d = \frac{1}{2} d \cdot (\sin\varphi)^2 \cdot \left[\left(\frac{d}{A}\right)^2 - 1\right], \qquad \text{Eq 2}$$

where d is the panel thickness, and A equals the order of the wave N, times Cz the zeroth order wave velocity, divided by twice the operating frequency.

As an example, assuming a 122 mil thick panel, a third order shear source mode and a Cz of 135 mils per microsecond, calculating the required step depth from Eq 2, results in an approximately 4 mil step depth. This is the required step depth (Δd) to totally internally reflect third order source shear waves diffracting seven degrees or less from the first axis. A groove shown in FIG. 8c, 806 also provides total internal reflection as long as the groove is wider than approximately two sensing wavelengths. The groove functions similarly to a step of the same depth. In practice, collimation grooves are etched on both sides of the glass with the grooves vertically aligned. The groove depth is then one half of that calculated from Eq 2 and is easily achieved.

A further calculation assuming the array converts third order shear source mode to a fifth order sensing mode for example shows that the groove has a negligible effect on the transmission of sensing waves through the groove. The sensor however may be sensitive to waves reflected from the grooves interfering with a touch response, similar to the effects of diffracted waves reflecting from an edge discussed previously. These reflected waves can be eliminated by choosing the width of the groove to be precisely two sensing wavelengths for example because a groove width that is a multiple of a half of a sensing mode wavelength will eliminate reflection due to phase cancellation.

Higher order source shear modes can be generated selectively and with sufficient amplitude. With edge mounted transducers which are preferred but not required with this disclosure, the following design process can be used. The solution of the wave equation for shear modes in an elastic plate in terms of stress has the form of a cosine Fourier series at the edge of the plate.

Figure 9A:
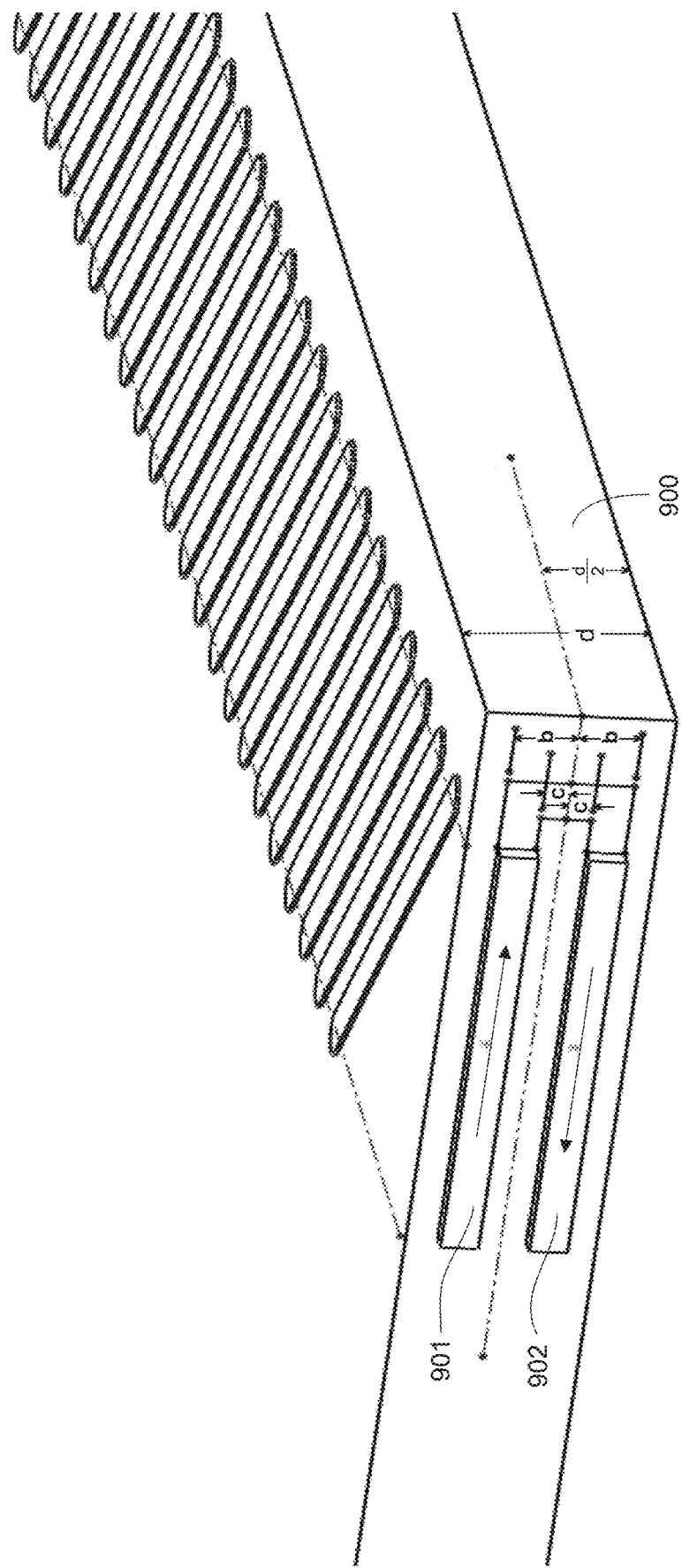
FIG. 9a is an illustration of a plate having two transducers bonded to the edge of the plate.
Figure 9B:
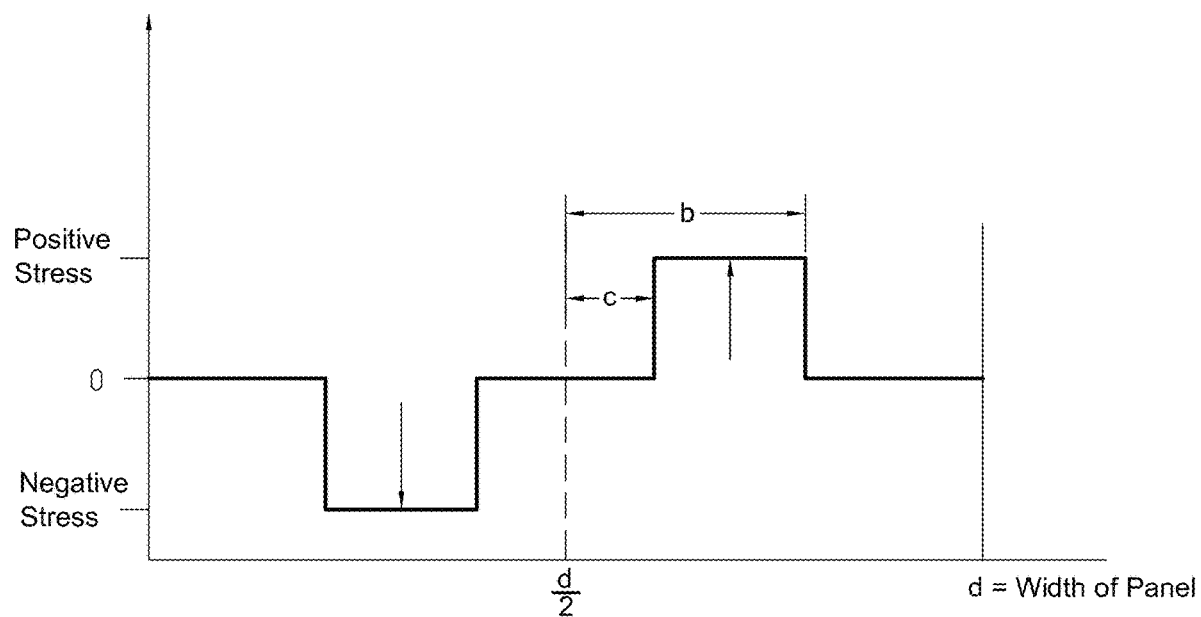
FIG. 9b is a representation of the assumed uniform stress produced by the transducers along the plate edge as shown in FIG. 9b.

Referring to FIG. 9a, there is shown two transducers 901 and 902, bonded to the edge of the plate. It is assumed that the stress produced by each transducer are opposite one another and uniform along the length of the transducer. The result is that any mode generated will be anti-symmetric. When the stress in each transducer is aligned only symmetric modes will be generated. A representation of the assumed uniform stress produced by the transducers along the edge plotted against the width d, of the panel is shown in FIG. 9b. This represents an instant in time; the stress amplitude actually varies sinusoidally with time.

We now take the Fourier transform of this stress, (assuming unit amplitude), and equate it to the solution of the wave equation at the edge boundary, which may be regarded as a Fourier series, and solve for the magnitudes of each mode order. This results in an equation for the amplitude Bn of each anti-symmetric shear mode:

$$Bn = \frac{4}{N \cdot \pi} \cdot \sin\left(\frac{N\pi}{2}\right) \cdot \left[\cos\left(\frac{N\pi c}{d}\right) - \cos\left(\frac{N\pi b}{d}\right)\right], \qquad \text{Eq 3}$$

where N is the order of the mode, d is the panel thickness and b and c are the dimensions shown in FIG. 9a.

Note that the sin(nπ/2) term is nonzero only for odd n or anti-symmetric modes.

Using similar reasoning the equation for symmetric modes is given as:

$$Bn = \frac{4}{N\pi} \cdot \cos\left(\frac{N\pi}{2}\right) \cdot \left[\left(\sin\left(\frac{bN\pi}{d}\right) - \sin\left(\frac{cN\pi}{d}\right)\right)\right]. \quad \text{Eq. 4}$$

Here the $$\cos\left(\frac{N\pi}{2}\right)$$

term guarantees symmetric modes.

Referring to Eq. 3 for example, to generate a third order shear mode of maximum amplitude, the sine term is always one (1) for anti-symmetric modes and therefore a maximum occurs when the first cosine term is one and the second term is minus one. Setting c equal to zero and the transducer width b equal to a third of the panel thickness ensures maximum third order generation with magnitude $$B3 = \frac{8}{3\pi}.$$

The first order mode, B1 has magnitude $$= \frac{2}{\pi}$$

and the fifth equals $$\frac{2}{5\pi}.$$

In this case the third order mode is some 33% higher than the first.

The array response as will be shown discriminates between source modes, however if the phase velocities between a chosen and spurious modes is small enough to create wave interference additional discrimination between source modes may be obtained by reducing the transducer width below that for maximum amplitude and by beveling the edge of the glass. All higher order shear modes may be regarded as the lowest order mode SH0 propagating along the panel and reflecting off of the major surfaces at an angle determined by the mode as shown in FIG. 10a.

The angle Θ (1001) is determined by the following equation:

$$\Theta = \tan^{-1}\left[\left(\frac{f}{fco}\right)^2 - 1\right] \quad \text{Eq. 5}$$

Where fco is the cut off frequency given by $$\frac{NCz}{2d}$$

When the bevel is formed as in FIG. 10b, such that the mode is launched at the calculated angle, 50 degrees, for example for third order of the previous example, first order is decreased significantly.

Another important consideration with source modes as well as sensing modes is that the fd (the product of panel thickness and operating frequency) at which they operate should be chosen among other considerations to be in a region where phase velocity changes only slightly with fd because this minimizes dispersion. Excessive dispersion causes timing inaccuracies, signal amplitude reduction and increased sensitivity to temperature and variations in panel thickness among other undesirable effects.

The benefits of exciting higher order shear modes vis-à-vis performance improvement will be appreciated. From the above, those skilled in the art will understand the purpose and design of the collimation grooves. Further, those skilled in the art will appreciate the placement, width and polarity of the transducers to produce higher order shear modes, edge beveling and applications of the sensor with use on sensors having thicker glass, which are typically more durable.

The ability to generate a specific source mode is necessary but not sufficient to produce acoustic touch panels of unrestricted thickness and enhanced features. As disclosed in Knowles '427, a desirable sensing mode is chosen, among other factors, on wave motion at the touch surface and selected by the echelon angle and spacing. An issue is that the array may generate more than one mode from a single source mode.

Figure 11:
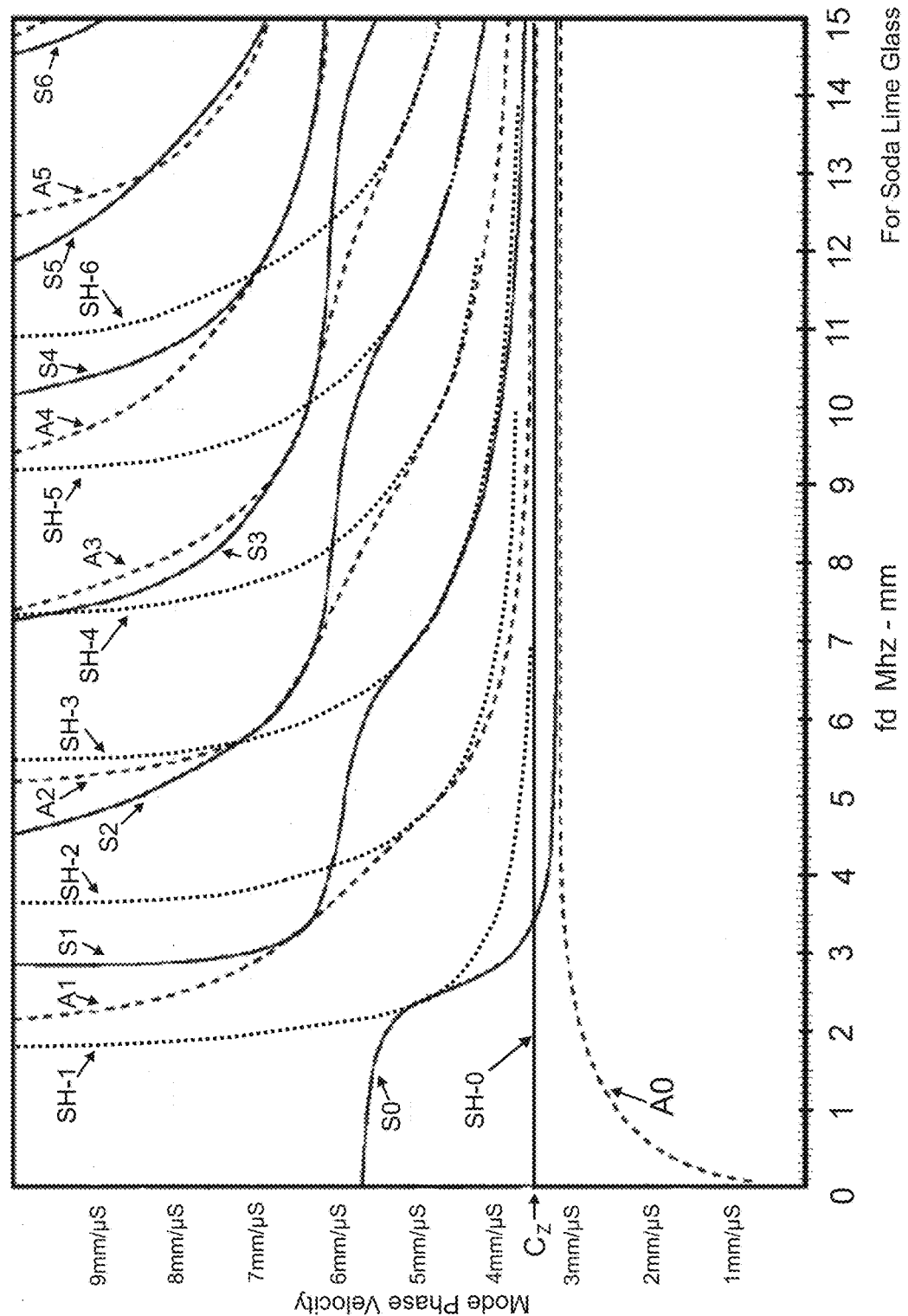
FIG. 11 is a dispersion diagram derived from the general wave equation for an elastic plate and includes Lamb and transverse shear modes.

Referring now to FIG. 11 there is shown a dispersion diagram that is derived from the general wave equation for an elastic plate and includes Lamb as well as transverse shear modes. Shear modes (SH-1-SH-6) are shown as dotted, anti-symmetric Lamb (A1-A5) as dashed and symmetric Lamb (S1-S6) as solid lines. FIG. 11 illustrates that when fd increases, which is necessary with thicker panels, increasing numbers of modes may exist in contrast to lowest order shear panels. Two or more sensing modes may be generated by the array from a single source at higher fd's and wave interference effects may make touch recognition impractical.

The practicality of a higher order mode acoustic panel is then dependent on suppressing spurious sensing modes. Spurious mode suppression has been achieved in this disclosure by a combination of: deploying the mode selection properties of the array; choosing a desirable mode sufficiently distant in phase velocity from any spurious mode; and by forming vertically aligned arrays on each major surface. Additionally, if desired, a coating that attenuates out of plane wave motion and not in plane wave motion may be employed, as will be discussed.

The array has a response that depends on the wavelength of the sensing mode. Using assumptions that are typically met in an acoustic touch panel the amplitude response for waves generated in the array is given by the following equation:

$$A = B\left[\frac{\sin\frac{E\pi l}{\lambda}}{\sin\frac{\pi l}{\lambda}}\right]^2 \quad \text{Eq. 6}$$

where E is the number of echelons in the width direction,
λ is the wavelength,
B is a constant, and
l is the echelon spacing in the width direction
This equation is plotted versus wavelength in FIG. 12.

As can be seen from FIG. 12 the response peaks, as indicated at 1201, when the wavelength equals the echelon spacing 1. Also the response is zero, as indicated at 1202, when the ratio of the spacing divided by the sensing wavelength increases or decreases from peak response by the reciprocal of the number of echelons, E. Phase velocity is equal to wavelength times frequency, hence the array response may be regarded as a phase velocity filter with pass band determined by the number of echelons along the width of an array.

A spurious mode may then be suppressed by selecting the peak response wavelength to that of the desired mode through echelon spacing and angle, and then choosing E such that a response zero occurs at or close to a spurious mode wavelength. In practice this is a very useful technique but has limitations for some desirable choices for the sensing mode. This is due to a spurious mode being so close to the desired mode in phase velocity that a very large E is required to suppress it. As a practical matter the smaller the E the better because the width of the array is proportional to E and narrow arrays are preferred because it allows for a larger screen viewing area.

Figure 13A:
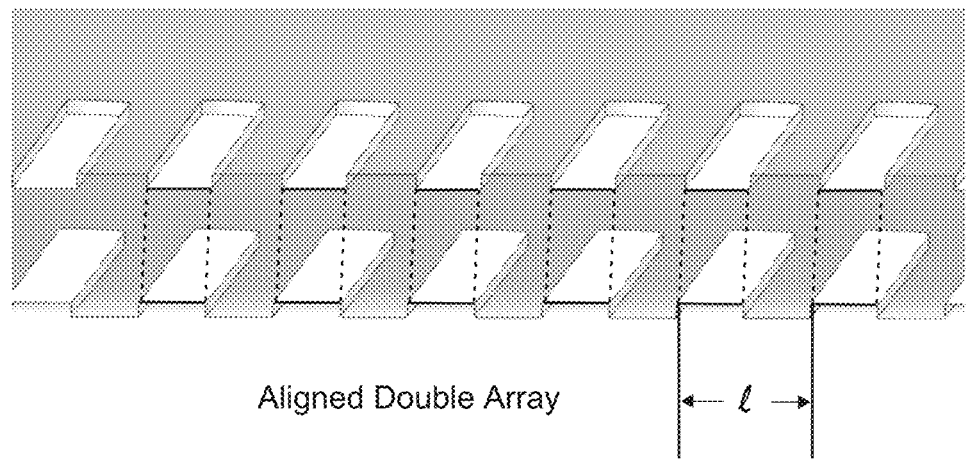
FIG. 13a a vertically aligned array pair.
Figure 13B:
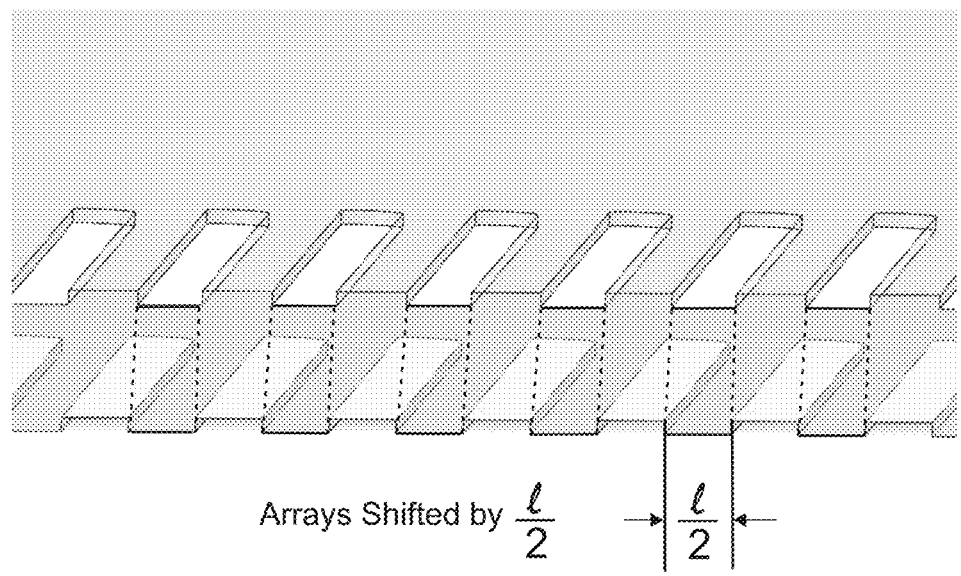
FIG. 13b illustrates a sensor having an array pair aligned with a shift of half the echelon spacing.

Spurious modes may be additionally suppressed even when two modes have identical phase velocities as long as the two modes have opposite symmetries through the deployment of arrays on both major surfaces. Both sensing and spurious modes have either symmetric or anti-symmetric wave motion as defined in Knowles '427, FIG. 1d. Referring to FIG. 13a this shows a vertically aligned array pair (top and bottom surface of panel) and FIG. 13b shows a pair aligned with a shift of half the echelon spacing.

Due to phase cancellation when the arrays are vertically aligned symmetric source modes can only generate symmetric sensing modes and anti-symmetric source modes can only generate anti-symmetric sensing modes. Conversely when the arrays are shifted by half a wavelength, symmetric source modes can only generate anti-symmetric sensing modes and anti-symmetric source modes can only generate symmetric sensing modes.

By proper choice of the source and sensing mode symmetry and fd it may be arranged for the nearest spurious mode to be suppressed by array pair alignment and spurious modes further away suppressed by the array response.

In practice the wavelength filtering properties and the vertical alignment of arrays are crucial in obtaining sensors of unrestricted thickness and improved touch attributes.

Another benefit of double arrays is that they quadruple the amplitude of the waves returning to the transducers for a given source mode amplitude because the sensing mode exits and after reflection from an opposing edge reenters the array. Double arrays double the amplitude of the sensing waves per pass and due to the fact that they exit and then reenter, the amplitude increases by a factor of four. In practice this is employed to reduce the etch depth and together with collimation grooves effectively increases the upper limit to sensor size. Double arrays can also reduce the wavelength discrimination required of the arrays, that is the width of the array can be reduced. Generally, undesirable source wave diffraction increases as the array width is reduced, but this is mitigated by the application of collimation grooves, thus the combination of grooves and double arrays allows for narrower arrays than in previous embodiments of acoustic array sensors.

A method has been found to further increase the discrimination between in plane and out of plane modes through the use of coatings with what is known as a non-Newtonian response to shear stress. That is the viscosity of some materials depend on the rate at which shear stress is applied. Some coating materials of which silicone is an example, have a molecular relaxation phenomenon causing viscous losses to be greatly reduced at typical operating frequencies which range from 1 MHZ to 8 MHz for the sensors disclosed. Viscosity related energy losses are the predominant cause of wave damping for shear modes. With materials that exhibit this relaxation phenomena, shear wave damping is minimal at sensor operating frequencies in contrast to out of plane modes. Here radiation damping predominates; that is compressional waves form and radiate out into the coating and cause significant wave damping. Thus, out of plane waves are greatly attenuated and shear waves are not when traveling through a silicone coated glass plate for example. In practice the coating in the form of tape with a silicone adhesive strip need be one third of an inch (⅓") wide or less to have a significant reduction of any residual out of plane spurious modes and is typically placed along opposing edges. This is important when the application requires the sensor to not register a touch event when a liquid is present on the surface, because as discussed, out of plane wave motion is very sensitive to liquids and even a small residual component may cause a false response especially when high touch sensitivity is required.

Figure 14:
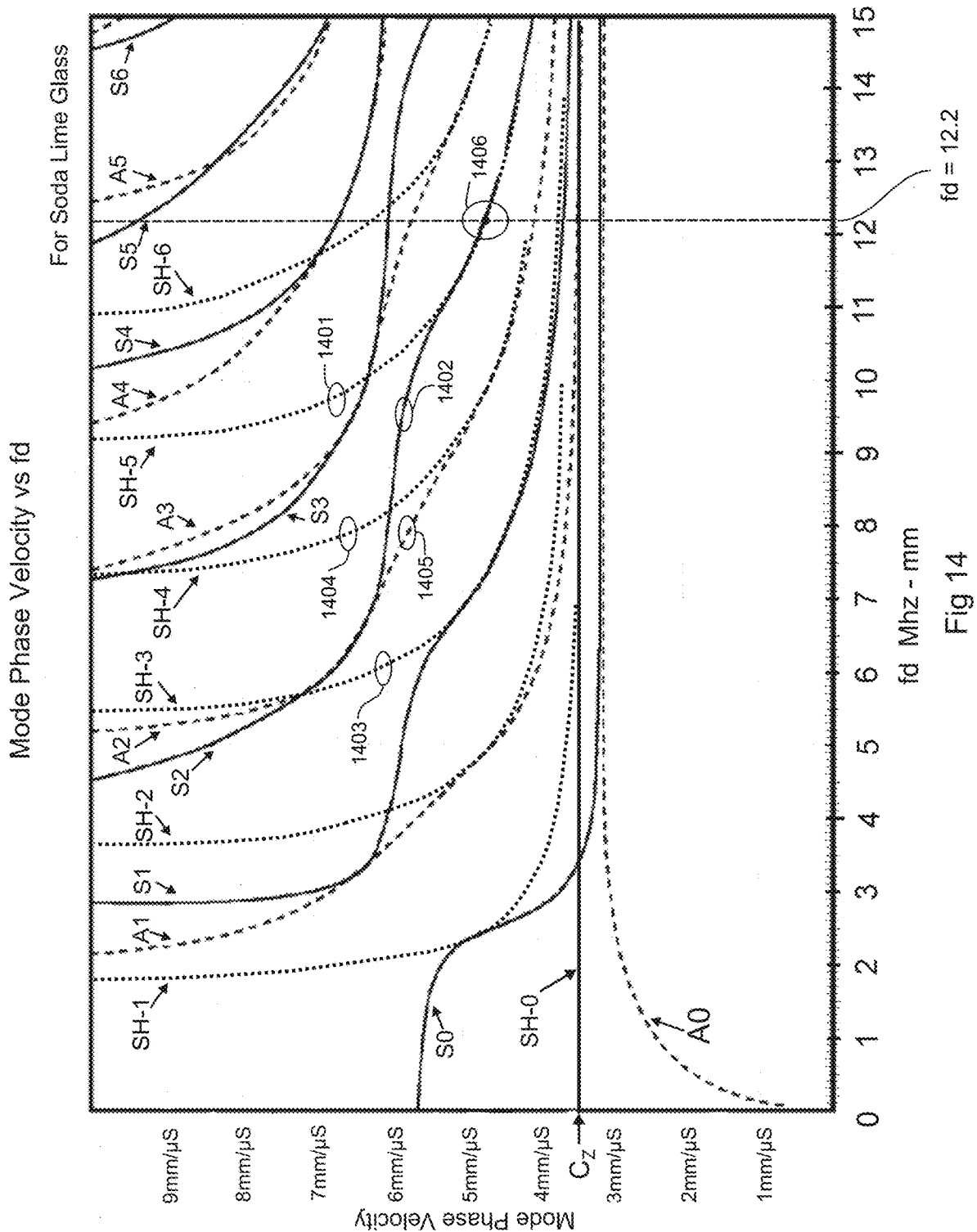
FIG. 14 is a dispersion diagram illustrating a higher order shear mode (SH5)

Sensing mode selection also depends on the application. Touch screens used in outdoor settings for example likely need to respond to a touch in a wet environment but not to a finger sliding across a screen. Referring to FIG. 14, a higher order shear mode such as SH5, (1401) is a likely choice. This allows for a higher fd and thus thicker glass which is important where, for example, vandalism may be a factor.

The touch sensitivity of SH5 is at least three times greater than the Zohps mode touch sensor and further enhanced by the discovery that operating the sensor at an fd approximately one percent greater than peak response increases all higher order shear and Lamb mode touch sensitivities, by approximately a factor of two. This touch sensitivity is adequate for an outdoor application and, because it is a shear mode, it will be insensitive to water on the touch surface.]

Referring still to FIG. 14, an example of a sensor of this type is the SH5 sensing mode 1401 at an fd of 12.2 (1406). The S2 Lamb mode 1402 is so close in phase velocity that using the array response to filter out S2 is impractical. This is due to the large number of echelons in the thickness direction required to narrow the pass band sufficiently, which implies a very wide array.

SH5 is an anti-symmetric mode, thus if SH3 for example is selected as an anti-symmetric source mode and generated according to the disclosed design procedures, vertically aligned arrays may be deployed to suppress S2. This is because S2 is a symmetric mode and cannot be generated by a vertically aligned array pair with an anti-symmetric source mode. Other potential spurious modes such as SH4 1404, and A2 1405 are either suppressed by the double array configuration or filtered out by the array response.

Touch sensors requiring high enough touch sensitivity to respond to a sliding finger can also use higher order shear as the sensing mode. This is more straightforward to accomplish with panels less than 1.5 mm in thickness because touch sensitivity for shear sensing modes increases as the panel thickness decreases. With panel thicknesses below 1.5 mm sensing with shear modes is adequate for most applications including tracking a sliding finger, and has the added advantage that the panel can be laminated to an underlying surface. Applications that require the highest touch sensitivity in thicker panels may utilize a higher shear source mode to a Lamb sensing mode with dominant out of plane motion at the surface. This can be accomplished for example simply by shifting the double array alignment of the previous SH3 to SH5 example. When the arrays are aligned with a half wavelength shift the SH3 source mode will generate the S3 symmetric mode and suppress SH5.

A further example employs an out of plane Lamb sensing mode for panels 1.5 mm thick and below. These are useful when thin panels and very high touch sensitivity is required and operation in the presence of water or other fluids is not necessary. In Knowles, U.S. Pat. No. 9,880,044 (Knowles, '044) a lowest order shear to lowest order Lamb, Ao was disclosed for a liquid level sensor. Due to the benefits of collimation grooves a higher order mode such as SH1 is preferred as the source mode, but Ao, retained as the sensing mode.

Figure 15:
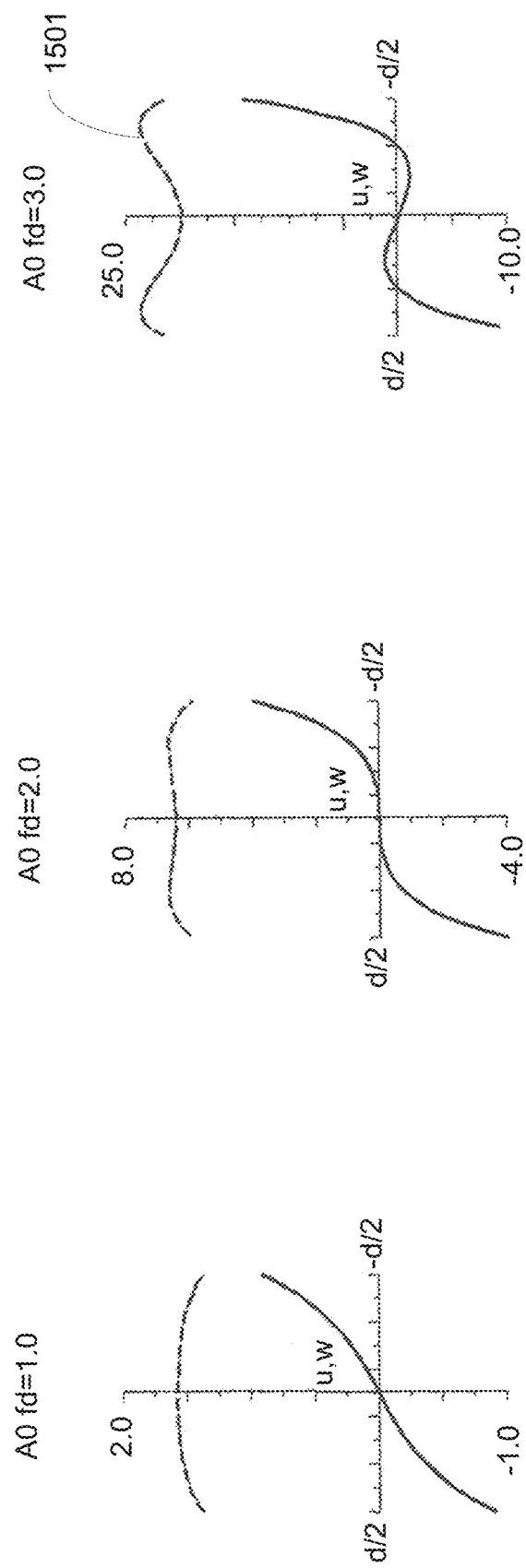
FIG. 15 illustrates the plate displacement for mode A0.

Referring to FIG. 15 these are plots showing a panel cross section of particle displacement versus distance in the plate thickness direction for Ao at various fds. These are obtained from the full wave equation for a plate with zero traction at both surfaces. The solid lines (those crossing the origin) represent in plane displacements and the dashed lines are out of plane or vertical displacements. In time, the displacements will move in sinusoidal motion. As can be seen Ao has significant out of plane motion at each panel surface for all the fds shown, which is desirable in this case and we choose an fd of 3 MHz-mm (1501).

Figure 16:
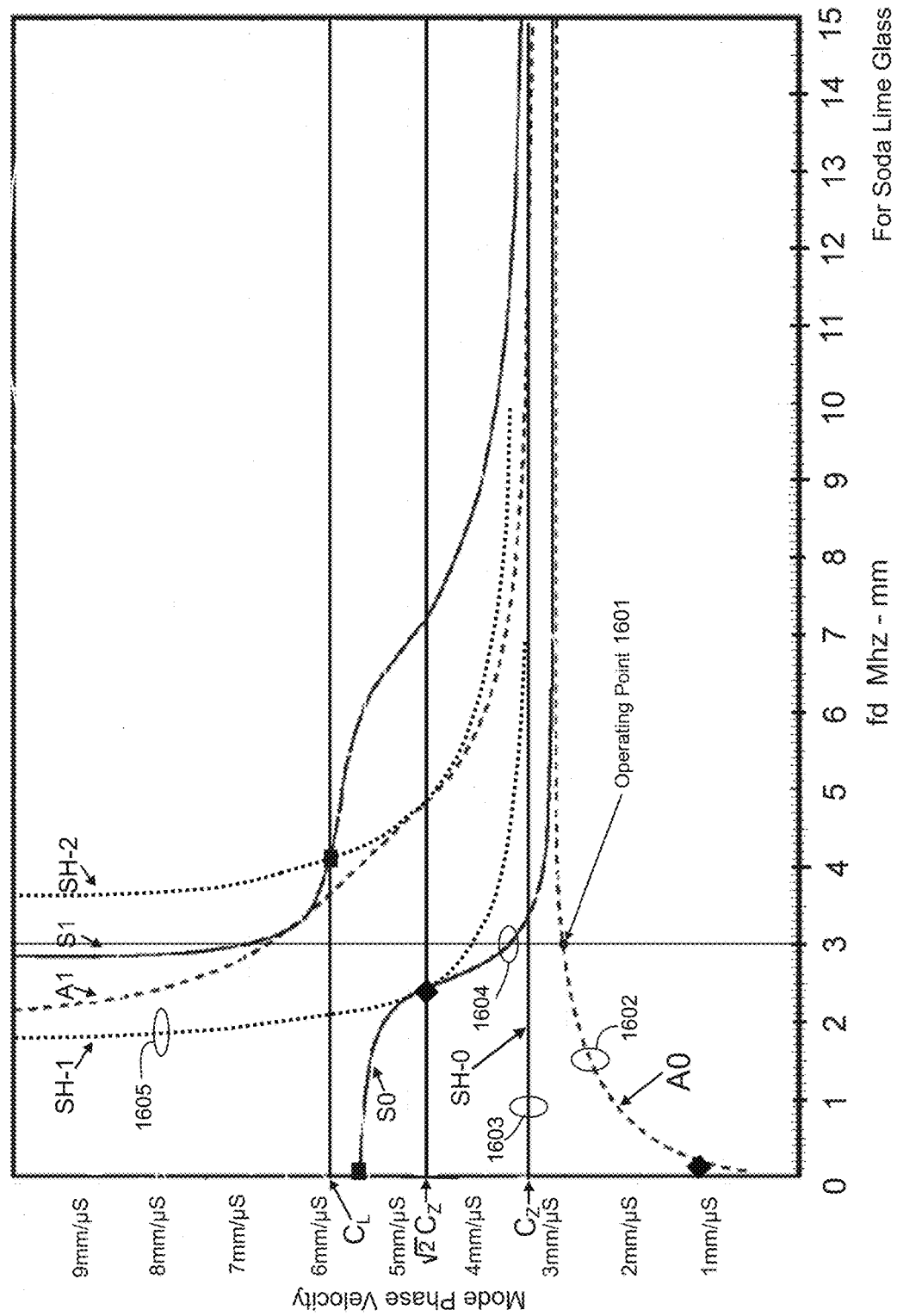
FIG. 16 is a dispersion diagram illustrating two potential spurious modes, lowest order shear and S0 and the available higher order shear source mode at an fd of 3 being SH1.

Referring to FIG. 16 there are two potential spurious modes, zeroth order shear 1603 and S0 1604 close to the operating point (1601). The only available higher order shear source mode at an fd of 3 is SH1 (1605). SH1 is anti-symmetric as is A0, but both of the potential spurious modes are symmetric. Therefore, choosing aligned double arrays will suppress SH0 and S0.

The criteria by which Lamb modes are selected will now be discussed. As previously described, higher order shear modes are preferred for source modes, and the array response plus double arrays greatly aids in selection and generation of a desired sensing mode. The selection of Lamb sensing modes is complicated by the fact that its dominant motion at the panel surface varies with fd, unlike shear modes.

Figure 17:
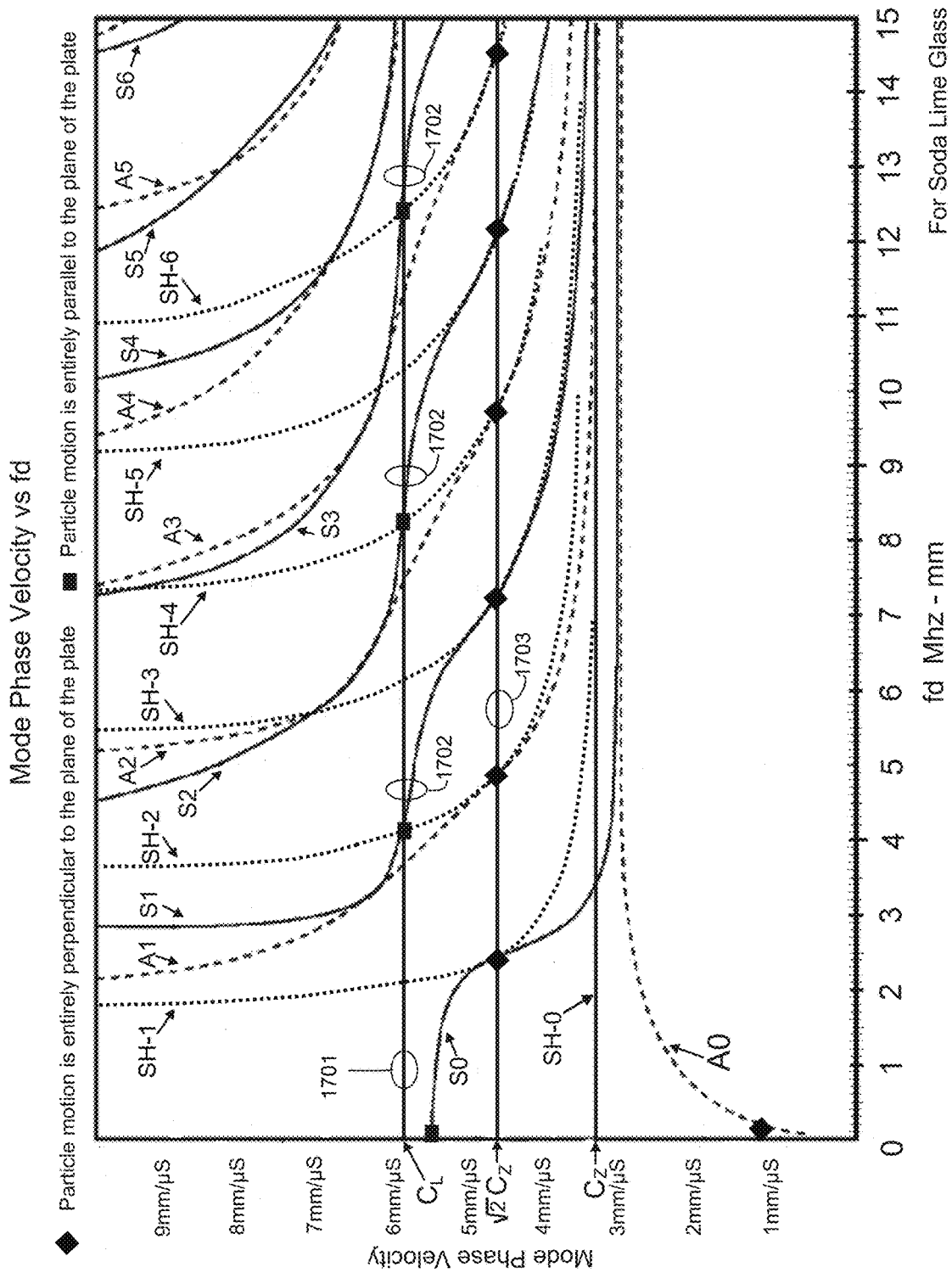
FIG. 17 is a dispersion diagram illustrating phase velocities where motion at the surface for Lamb modes is entirely vertical or out of plane and horizontal or in plane.

Referring to FIG. 17, this is similar to FIG. 14 but shown with phase velocities marked where motion at the surface for Lamb modes is entirely horizontal or in plane, 1701, or entirely out of plane, 1703. Motion is entirely in plane for all higher order symmetric Lamb modes when their phase velocity equals that of a bulk compressional wave Cl, such as indicated in 1701. These are useful modes for touch sensors that need to operate in the presence for example of water.

Unfortunately there is always a higher order shear mode with the same symmetry coinciding with the Lamb mode at the bulk compressional mode phase velocity. Selecting an fd close to that of a symmetric Lamb mode at the bulk shear velocity retains substantial in plane motion at the surface of the mode but far enough away that the array response filters out the symmetric shear mode is a viable approach to sensors that are impervious to water, as shown for example as indicated at 1702. An antisymmetric Lamb mode is also close in phase velocity but because it has the opposite symmetry to the selected Lamb mode, double arrays properly aligned will suppress this mode.

Also as shown, when the phase velocity is that of the zeroth order shear Cz times the square root of two, for all Lamb modes but Ao, motion at the surface is entirely out of plane, 1703. These modes will be almost totally absorbed by rain droplets for example but are very touch sensitive. At the fd at which this phase velocity occurs for Lamb modes there will also be a shear mode but always with opposite symmetry to the Lamb mode.

Selecting a source mode with the same symmetry as the Lamb mode and operating with aligned arrays will suppress the spurious shear mode as will selecting a source mode with opposite symmetry and operating with the array pair with a half wavelength shift. The choice will depend on the symmetry of the next nearest spurious mode. Inspection of FIG. 17 shows, other potential spurious modes are sufficiently far enough away in phase velocity that the array response is sufficient to filter them out. Given the ability to select and isolate desirable modes as taught in this disclosure, it will be obvious to those skilled in the art that other combinations of source and sensing modes are possible.

It will be appreciated that the sensing modes are chosen based on motion at the surface of the sensor. Out of plane modes will exhibit very high sensitivity to finger/touch and high sensitivity to water. In plane mode can also exhibit very high finger/touch sensitivity, but insensitivity to water particularly in thinner touch panels. It is also noted that higher order shear modes are more touch sensitive than SH0 and have very good water insensitivity.

As noted above, the arrays can generate all kinds of unwanted modes that need to be suppressed. However, the use of two arrays, one on each surface (e.g., upper and lower or top and bottom surfaces), which arrays are aligned, or half wavelength shifted can be used to suppress unwanted modes as it can be used to determine the symmetry of the sensing modes. That is, the arrays themselves can be used to filter out unwanted modes.

In aspects, the present touch sensor improves on prior known touch sensors or touch panels in a number of ways. In one aspect, the touch sensitivity of touch panels is increased and can permit use of the sensor by gloved individuals and reduce the sensitivity of liquids (e.g., water) on the sensor. In one aspect, such a method includes operating the sensor between 0.55% and about 1-2% above array peak frequency. This increases the touch sensitivities of all higher order shear and Lamb modes.

Methods also include operating with selected even order sensing Lamb modes with phase velocities close to the bulk longitudinal velocity. Still other methods include selecting Lamb modes with phase velocities at or close to the square root of 2Cz, the zeroth order wave velocity.

It will this be appreciated by those skilled in the art that source mode selection, sensing mode selection, array response and spurious mode selection allows for operating with thicker glass, thus increasing the possible uses of such touch sensors.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A touch panel comprising:
    a substrate having first and second surfaces and edges extending between the first and second surfaces defining a thickness;
    a first plurality of echelons arranged on the first surface of the substrate in a first array along a first centerline, each echelon in the first plurality of echelons formed at a first angle relative to the first centerline;
    a first shear transducer mounted on the edge of the substrate, the first transducer configured to generate a shear wave in a source wave mode in a first direction along the first centerline, wherein the first transducer is a pair of first transducers mounted along the edge;
    a second plurality of echelons arranged on the first surface of the substrate in a second array along a second centerline, each echelon in the second plurality of echelons formed at a second angle relative to the second centerline, the second centerline being orthogonal to the first centerline; and
    a second shear transducer mounted on the edge of the substrate, the second transducer configured to generate a shear wave in a source wave mode in a second direction along the second centerline, wherein the second transducer is a pair of second transducers mounted along the edge,
    wherein the first pair of transducers is aligned relative to a line perpendicular to and between the first and second surfaces and wherein the second pair of transducers is aligned relative to a different line perpendicular to and between the first and second surfaces,
    wherein the shear wave generated by the first shear wave transducer propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer, and
    wherein the shear wave generated by the second shear wave transducer propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer.

2. The panel of claim 1, wherein the transducers of the first pair of transducers are oriented to generate stresses in a same direction and wherein the transducers of the second pair of transducers are oriented to generate stresses in a same direction.

3. The touch panel of claim 1, wherein the transducers of the first pair of transducers are oriented to generate stresses in opposite directions and wherein the transducers of the second pair of transducers are oriented to generate stresses in opposite directions.

4. The touch panel of claim 1 further including a first edge diverter disposed on the edge of the substrate at an end of the first array and a second edge diverter disposed on the edge of the substrate at an end of the second array, and wherein the first and second edge diverters convert the source mode from a first mode to a second mode different from the first mode.

5. The touch panel of claim 1 further including a non-Newtonian coating on the substrate.

6. A touch panel, comprising:
    a substrate having first and second surfaces and edges extending between the first and second surfaces defining a thickness;
    a first plurality of echelons arranged on the first surface of the substrate in a first array along a first centerline, each echelon in the first plurality of echelons formed at a first angle relative to the first centerline;
    a first shear transducer mounted on the edge of the substrate, the first transducer configured to generate a shear wave in a source wave mode in a first direction along the first centerline;
    a second plurality of echelons arranged on the first surface of the substrate in a second array along a second centerline, each echelon in the second plurality of echelons formed at a second angle relative to the second centerline, the second centerline being orthogonal to the first centerline; and
    a second shear transducer mounted on the edge of the substrate, the second transducer configured to generate a shear wave in a source wave mode in a second direction along the second centerline,
    wherein the shear wave generated by the first shear wave transducer propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer, and
    wherein the shear wave generated by the second shear wave transducer propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer, and further including
    a third plurality of echelons arranged on the substrate in a third array along a third centerline parallel to the first centerline and on the second side of the substrate, each echelon in the third plurality of echelons formed at a first angle relative to the third centerline, and
    a fourth plurality of echelons arranged on the substrate in a fourth array along a fourth centerline parallel to the second centerline and on the second side of the substrate, each echelon in the fourth plurality of echelons formed at a first angle relative to the fourth centerline,
    wherein the shear wave generated by the first shear wave transducer propagates along the third centerline and wherein the shear wave is reflected at the first angle by the one or more of the plurality of echelons in the third array to a first sensing wave or the shear wave is converted to a different wave mode than the source mode, wherein the first sensing wave is reflected off of an edge opposing the third centerline and is sensed by the first transducer, and
    wherein the shear wave generated by the second shear wave transducer propagates along the fourth centerline and wherein the shear wave is reflected at the second angle by the one or more of the plurality of echelons in the fourth array to a second sensing wave or the shear wave is converted to a different wave mode than the source mode, wherein the second sensing wave is reflected off of an edge opposing the fourth centerline and is sensed by the second transducer.

7. The touch panel of claim 6, wherein the first and third plurality of echelons are aligned with one another and the second and fourth plurality of echelons are aligned with one another.

8. The touch panel of claim 6, wherein the first and third plurality of echelons are staggered from one another and the second and fourth plurality of echelons are staggered from one another.

9. A touch panel comprising:
a substrate having first and second surfaces and edges extending between the first and second surfaces defining a thickness;
a first plurality of echelons arranged on the first surface of the substrate in a first array along a first centerline, each echelon in the first plurality of echelons formed at a first angle relative to the first centerline;
a first shear transducer mounted on the edge of the substrate, the first transducer configured to generate a shear wave in a source wave mode in a first direction along the first centerline;
a first collimation groove formed in the substrate inboard of, and parallel to, the first array;
a second plurality of echelons arranged on the first surface of the substrate in a second array along a second centerline, each echelon in the second plurality of echelons formed at a second angle relative to the second centerline, the second centerline being orthogonal to the first centerline;
a second shear transducer mounted on the edge of the substrate, the second transducer configured to generate a shear wave in a source wave mode in a second direction along the second centerline; and
a second collimation groove formed in the substrate inboard of, and parallel to, the second array,
wherein the shear wave generated by the first shear wave transducer propagates along the first centerline and wherein the shear wave is reflected at the first angle by the one or more of the plurality of echelons in the first array to a first sensing wave or the shear wave is converted to a different wave mode than the source mode, wherein the first sensing wave is reflected off of an edge opposing the first centerline and is sensed by the first transducer, and wherein the first collimation groove is configured to confine the source wave to the first array and permit the first sensing wave to traverse beyond the first collimation groove, and
wherein the shear wave generated by the second shear wave transducer propagates along the second centerline and wherein the shear wave is reflected at the second angle by the one or more of the plurality of echelons in the second array to a second sensing wave or the shear wave is converted to a different wave mode than the source mode, wherein the second sensing wave is reflected off of an edge opposing the second centerline and is sensed by the second transducer, and wherein the second collimation groove is configured to confine the source wave to the second array and permit the second sensing wave to traverse beyond the second collimation groove.

10. The touch panel of claim 9, wherein a depth of the first and/or second collimation groove is determined by the equation $$\Delta d == \frac{1}{2} d \cdot (\sin\varphi)^2 \cdot \left[\left(\frac{d}{A}\right)^2 - 1\right],$$

where $\Delta d$ is the depth of the first and/or second collimation groove,
$\varphi$ is a greatest angle allowed for total internal reflection,
d is a thickness of the substrate, and
A is an order of a wave N, multiplied by Cz, a zeroth order wave velocity, divided by two times the operating frequency.

11. The touch panel of claim 9 further including
a third plurality of echelons arranged on the substrate in a third array along a third centerline parallel to the first centerline and on the second side of the substrate, each echelon in the third plurality of echelons formed at a first angle relative to the third centerline;
a third collimation groove formed in the substrate inboard of, and parallel to, the third array;
a fourth plurality of echelons arranged on the substrate in a fourth array along a fourth centerline parallel to the second centerline and on the second side of the substrate, each echelon in the fourth plurality of echelons formed at a first angle relative to the fourth centerline; and
a fourth collimation groove formed in the substrate inboard of, and parallel to, the fourth array,
wherein the shear wave generated by the first shear wave transducer propagates along the third centerline and wherein the shear wave is reflected at the first angle by the one or more of the plurality of echelons in the third array to a third sensing wave or the shear wave is converted to a different wave mode than the source mode, wherein the third sensing wave is reflected off of an edge opposing the third centerline and is sensed by the first transducer,
wherein the shear wave generated by the second shear wave transducer propagates along the fourth centerline and wherein the shear wave is reflected at the second angle by the one or more of the plurality of echelons in the fourth array to a fourth sensing wave or the shear wave is converted to a different wave mode than the source mode, wherein the fourth sensing wave is reflected off of an edge opposing the fourth centerline and is sensed by the second transducer,
wherein the first collimation groove is configured to confine the source wave to the first array and permit the first sensing wave to traverse beyond the first collimation groove,
wherein the second collimation groove is configured to confine the source wave to the second array and permit the second sensing wave to traverse beyond the second collimation groove,
wherein the third collimation groove is configured to confine the source wave to the third array and permit the third sensing wave to traverse beyond the third collimation groove, and
wherein the fourth collimation groove is configured to confine the source wave to the fourth array and permit the fourth sensing wave to traverse beyond the fourth collimation groove.

12. The touch panel of claim 11, wherein a depth of the third and/or fourth collimation grooves is determined by the equation $$\Delta d == \frac{1}{2} d \cdot (\sin\varphi)^2 \cdot \left[\left(\frac{d}{A}\right)^2 - 1\right],$$

where $\Delta d$ is the depth of the third and/or fourth collimation groove,
$\varphi$ is a greatest angle allowed for total internal reflection,
d is a thickness of the substrate, and
A is an order of a wave N, multiplied by Cz, a zeroth order wave velocity, divided by two times the operating frequency.

13. The touch panel of claim 9 further including a non-Newtonian coating on the substrate.

14. A touch panel comprising:
a substrate having first and second surfaces and edges extending between the first and second surfaces defining a thickness;
a first plurality of echelons arranged on the first surface of the substrate in a first array along a first centerline, each echelon in the first plurality of echelons formed at a first angle relative to the first centerline;
a first pair of shear transducers mounted on the edge of the substrate, the first pair of transducer configured to generate shear waves in a source wave mode in a first direction along the first centerline, wherein the first transducer is a pair of first transducers mounted along the edge;
a second plurality of echelons arranged on the first surface of the substrate in a second array along a second centerline, each echelon in the second plurality of echelons formed at a second angle relative to the second centerline, the second centerline being orthogonal to the first centerline; and
a second pair of shear transducers mounted on the edge of the substrate, the second pair of transducers configured to generate shear waves in a source wave mode in a second direction along the second centerline, wherein the second transducer is a pair of second transducers mounted along the edge,
wherein the first pair of transducers is aligned relative to a line perpendicular to and between the first and second surfaces and wherein the second pair of transducers is aligned relative to a different line perpendicular to and between the first and second surfaces,
wherein the shear waves generated by the first pair of shear wave transducers propagate along the first centerline and wherein the shear waves are reflected at the first angle by the one or more of the plurality of echelons in the first array to first sensing waves or the shear waves are converted to a different wave mode than the source mode, wherein the first sensing waves are reflected off of an edge opposing the first centerline and are sensed by the first pair of transducers, and
wherein the shear waves generated by the second pair of shear wave transducers propagate along the second centerline and wherein the shear waves are reflected at the second angle by the one or more of the plurality of echelons in the second array to second sensing waves or the shear waves are converted to a different wave mode than the source mode, wherein the second sensing waves are reflected off of an edge opposing the second centerline and are sensed by the second pair of transducers.

15. The touch panel of claim 14, wherein the transducers of the first pair of transducers are mounted on the edge of the substrate transverse to a direction of the first array, and are configured for generating waves in anti-symmetric shear mode, the transducers of the first pair of transducers being spaced from one another a distance determined by the equation, $$Bn = \frac{4}{N \cdot \pi} \cdot \sin\left(\frac{N\pi}{2}\right) \cdot \left[\cos\left(\frac{N\pi c}{d}\right) - \cos\left(\frac{N\pi b}{d}\right)\right]$$

where Bn is an amplitude of each wave of the shear mode,
N is an order of the mode,
d is a thickness of the substrate,
b is a distance from a centerline of the substrate to an outboard edge of the transducers, and
c is a distance from an inboard edge of the transducers to a centerline of the substrate.

16. The touch panel of claim 14, wherein the transducers of the first pair of transducers are mounted on the edge of the substrate transverse to a direction of the first array, and are configured for generating waves in symmetric shear mode, the transducers of the first pair of transducers being spaced from one another a distance determined by the equation, $$Bn = \frac{4}{N\pi} \cdot \cos\left(\frac{N\pi}{2}\right) \cdot \left[\left(\sin\left(\frac{bN\pi}{d}\right) - \sin\left(\frac{cN\pi}{d}\right)\right]\right],$$

where Bn is an amplitude of each wave of the shear mode,
N is an order of the mode,
d is a thickness of the substrate,
b is a distance from a centerline of the substrate to an outboard edge of the transducers, and
c is a distance from an inboard edge of the transducers to a centerline of the substrate.

17. The touch panel of claim 15, wherein the transducers of the second pair of transducers are mounted on the edge of the substrate transverse to a direction of the second array, and are configured for generating waves in anti-symmetric shear mode, the transducers of the first pair of transducers being spaced from one another a distance determined by the equation, $$Bn = \frac{4}{N \cdot \pi} \cdot \sin\left(\frac{N\pi}{2}\right) \cdot \left[\cos\left(\frac{N\pi c}{d}\right) - \cos\left(\frac{N\pi b}{d}\right)\right],$$

where Bn is an amplitude of each wave of the shear mode,
N is an order of the mode,
d is a thickness of the substrate,
b is a distance from a centerline of the substrate to an outboard edge of the transducers, and
c is a distance from an inboard edge of the transducers to a centerline of the substrate.

18. The touch panel of claim 16, wherein the transducers of the second pair of transducers are mounted on the edge of the substrate transverse to a direction of the second array, and are configured for generating waves in symmetric shear mode, the transducers of the first pair of transducers being spaced from one another a distance determined by the equation, $$Bn = \frac{4}{N\pi} \cdot \cos\left(\frac{N\pi}{2}\right) \cdot \left[\left(\sin\left(\frac{bN\pi}{d}\right) - \sin\left(\frac{cN\pi}{d}\right)\right)\right]$$

where Bn is an amplitude of each wave of the shear mode,
N is an order of the mode,
d is a thickness of the substrate,
b is a distance from a centerline of the substrate to an outboard edge of the transducers, and
c is a distance from an inboard edge of the transducers to a centerline of the substrate.

19. The touch panel of claim 14 further including a non-Newtonian coating on the substrate.

20. The touch panel of claim 11, wherein the edge has first and second bevels between the first and second surfaces, the first and second bevels being formed at angle Θ to one another between and exclusive of 0 degrees and 90 degrees, a first transducer of the first pair of transducers mounted on the first bevel and a second transducer of the second pair of transducers mounted on the second bevel.

21. The touch panel of claim 20, wherein the angle Θ is determined by the equation, $$\Theta = \tan^{-1}\left[\left(\frac{f}{fco}\right)^2 - 1\right],$$

where f is frequency of the source wave,
fco is the cut off frequency given by $$\frac{NCz}{2d},$$

where
N is an order of the mode, and
Cz is a phase velocity of a zeroth order shear mode, and
d is a thickness of the substrate.

* * * * *